(12) United States Patent
Matsuda

(10) Patent No.: US 8,379,537 B2
(45) Date of Patent: Feb. 19, 2013

(54) NETWORK DEVICE MANAGEMENT SYSTEM, NETWORK DEVICE MANAGEMENT DEVICE, AND NETWORK DEVICE MANAGEMENT PROGRAM

(75) Inventor: Makoto Matsuda, Ama-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 611 days.

(21) Appl. No.: 10/969,981

(22) Filed: Oct. 22, 2004

(65) Prior Publication Data
US 2005/0099962 A1 May 12, 2005

(30) Foreign Application Priority Data
Oct. 24, 2003 (JP) ................ 2003-365153

(51) Int. Cl.
*H04L 12/28* (2006.01)
*H04W 4/00* (2009.01)
*H04J 3/16* (2006.01)
*H04M 3/00* (2006.01)

(52) U.S. Cl. ........ 370/254; 370/338; 370/346; 455/418; 455/419; 455/420

(58) Field of Classification Search .................. 370/338, 370/346; 709/100, 221, 222
See application file for complete search history.

(56) References Cited

U.S. PATENT DOCUMENTS

| | | | | |
|---|---|---|---|---|
| 5,321,542 A * | 6/1994 | Freitas et al. | ......... | 398/127 |
| 5,572,528 A * | 11/1996 | Shuen | ......... | 370/402 |
| 5,726,984 A * | 3/1998 | Kubler et al. | ......... | 370/349 |
| 5,969,678 A * | 10/1999 | Stewart | ......... | 342/457 |
| 6,229,807 B1 * | 5/2001 | Bauchot et al. | ......... | 370/241.1 |
| 6,842,433 B2 * | 1/2005 | West et al. | ......... | 370/312 |
| 6,918,022 B2 * | 7/2005 | Li et al. | ......... | 711/171 |
| 7,295,524 B1 * | 11/2007 | Gray et al. | ......... | 370/254 |
| 7,493,378 B2 * | 2/2009 | Kawashima | ......... | 709/223 |
| 2002/0111698 A1 * | 8/2002 | Graziano et al. | ......... | 700/17 |
| 2002/0178365 A1 * | 11/2002 | Yamaguchi | ......... | 713/182 |
| 2003/0041085 A1 * | 2/2003 | Sato | ......... | 709/100 |
| 2003/0120811 A1 * | 6/2003 | Hanson et al. | ......... | 709/245 |
| 2004/0015575 A1 * | 1/2004 | Motoyama | ......... | 709/222 |
| 2004/0066776 A1 * | 4/2004 | Ishidoshiro | ......... | 370/352 |
| 2004/0143428 A1 * | 7/2004 | Rappaport et al. | ......... | 703/22 |
| 2004/0179505 A1 * | 9/2004 | Critz et al. | ......... | 370/338 |
| 2005/0120305 A1 * | 6/2005 | Engstrom et al. | ......... | 715/760 |
| 2005/0157691 A1 * | 7/2005 | Stewart et al. | ......... | 370/338 |
| 2008/0031185 A1 * | 2/2008 | Bims | ......... | 370/328 |

FOREIGN PATENT DOCUMENTS

| | | | |
|---|---|---|---|
| JP | A-11-027285 | | 1/1999 |
| JP | 2001156808 A | * | 6/2001 |
| JP | A-2002-264431 | | 9/2002 |

* cited by examiner

*Primary Examiner* — Huy C Ho
(74) *Attorney, Agent, or Firm* — Oliff & Berridge, PLC

(57) ABSTRACT

A network device management system includes a computer that is connected to a network and at least one network device that is connected to the network and is capable of communicating with the computer via the network. Each network device includes a network device controller that provides the computer with network device information about settings and conditions of each network device of the at least one network device, via the network. The network device information includes connection type information that indicates whether each network device is a wired connection type or a wireless connection type. The computer includes a computer controller that obtains the network device information from each network device via the network and outputs a part or all of contents of the network device information including at least the connection type information, based on the obtained network device information.

10 Claims, 26 Drawing Sheets

FIG.3A

| MIB TYPE | VALUE |
|---|---|
| CONNECTION TYPE | 1 (WIRELESS LAN) |
| PRINTER NODE NAME | BRN_123456 |
| MAC ADDRESS | 00.11.22.33.44.56 |
| IP ADDRESS | 123.456.789.013 |

FIG.3B

| MIB TYPE | VALUE |
|---|---|
| RADIO FIELD STRENGTH | EXTREMELY WEAK |
| CPUCOMMUNICATION QUALITY | BAD |
| SSID | Brothe |
| THRESHOLD LEVEL | EXTREMELY WEAK |

FIG.3C

| MIB TYPE | VALUE |
|---|---|
| RADIO FIELD STRENGTH | STRONG |
| COMMUNICATION QUALITY | GOOD |
| DEVICE ADDRESS | 11:22:33:44:55:66 |
| THRESHOLD LEVEL | WEAK |

FIG. 4

| PRINTER NODE NAME | MAC ADDRESS | IP ADDRESS | CONNECTION TYPE | RADIO FIELD STRENGTH | COMMUNICATION QUALITY | SSID | DEVICE ADDRESS | NEW PRINTER FLAG | NEW REGISTRATION TIME | RECEIVING LEVEL WARNING FLAG | THRESHOLD LEVEL |
|---|---|---|---|---|---|---|---|---|---|---|---|
| BRN_112233 | 00.11.22.33.44.55 | 123.456.789.012 | 0 (WIRED CONNECTION) | 0 (WIRED CONNECTION) | 0 (WIRED CONNECTION) | 0 (WIRED CONNECTION) | 0 (WIRED CONNECTION) | 0 (EXISTING) | 0 (EXISTING) | 0 | 0 |
| BRN_123456 | 00.11.22.33.44.56 | 123.456.789.013 | 1 (WIRELESS LAN CONNECTION) | EXTREMELY WEAK | BAD | Brothe | 0 (WIRELESS LAN CONNECTION) | 0 (EXISTING) | 0 (EXISTING) | 1 | EXTREMELY WEAK |
| BRN_332211 | 00.11.22.33.44.57 | 123.456.789.014 | 0 (WIRED CONNECTION) | 0 (WIRED CONNECTION) | 0 (WIRED CONNECTION) | 0 (WIRED CONNECTION) | 0 (WIRED CONNECTION) | 0 (EXISTING) | 0 (EXISTING) | 0 | 0 |
| BRN_332212 | 00.11.22.33.44.58 | 123.456.789.015 | 2 (Bluetooth) | STRONG | GOOD | BT_Brothe | 11:22:33:44:55:66 | 1 (NEW) | 123456 SEC. | 1 | WEAK |

FIG.5

| PRINTER NODE NAME | MAC ADDRESS | IP ADDRESS | RADIO FIELD STRENGTH | COMMUNICATION QUALITY | CONNECTION TYPE | SSID |
|---|---|---|---|---|---|---|
| BRN_112233 | 00.11.22.33.44.55 | 123.456.789.012 | 0 (WIRED CONNECTION) | 0 (WIRED CONNECTION) | 0 (WIRED CONNECTION) | 0 (WIRED CONNECTION) |
| BRN_123456 | 00.11.22.33.44.56 | 123.456.789.013 | EXTREMELY WEAK | BAD | 1 (WIRELESS LAN CONNECTION) | Brothe |
| BRN_332211 | 00.11.22.33.44.57 | 123.456.789.014 | 0 (WIRED CONNECTION) | 0 (WIRED CONNECTION) | 0 (WIRED CONNECTION) | 0 (WIRED CONNECTION) |
| BRN_332212 | 00.11.22.33.44.58 | 123.456.789.015 | STRONG | GOOD | 2 (Bluetooth) | BT_Brothe |

FIG. 6

| CONNECTION TYPE | INFORMATION UPDATE TIME (UNDER NORMAL CONDITIONS) | INFORMATION UPDATE TIME (DURING OCCURRENCE OF CONNECTION ERROR) | INFORMATION UPDATE TIME (DURING WARNING OF RECEIVING LEVEL) | NEW PRINTER INFORMATION UPDATE TIME | NEW PRINTER EXISTING TIME | CONNECTION TIMEOUT PERIOD | NUMBER OF RETRIES | INFORMATION PREVIOUS UPDATE TIME |
|---|---|---|---|---|---|---|---|---|
| WIRED CONNECTION | 300 SEC. | 300 SEC. | NOT APPLICABLE | 300 SEC. | 300 SEC. | 1 MIN. | 0 | 56789 SEC. |
| WIRELESS CONNECTION | 30 SEC. | 10 SEC. | 10 SEC. | 10 SEC. | 300 SEC. | 30 SEC. | 2 | 56790 SEC. |

FIG.7

| CONNECTION TYPE | GOOD | BAD |
|---|---|---|
| WIRED CONNECTION | 🖨 | 🖨 |
| WIRELESS CONNECTION | 🖨))) | 🖨 |
| UNKNOWN | 🖨 | 🖨 |

FIG.8

| PRINTER NODE NAME | SSID | COMMUNICATION QUALITY |
|---|---|---|
| BRN_123456 | Brothe | ERROR |
| BRN_332212 | BT_Brothe | GOOD |

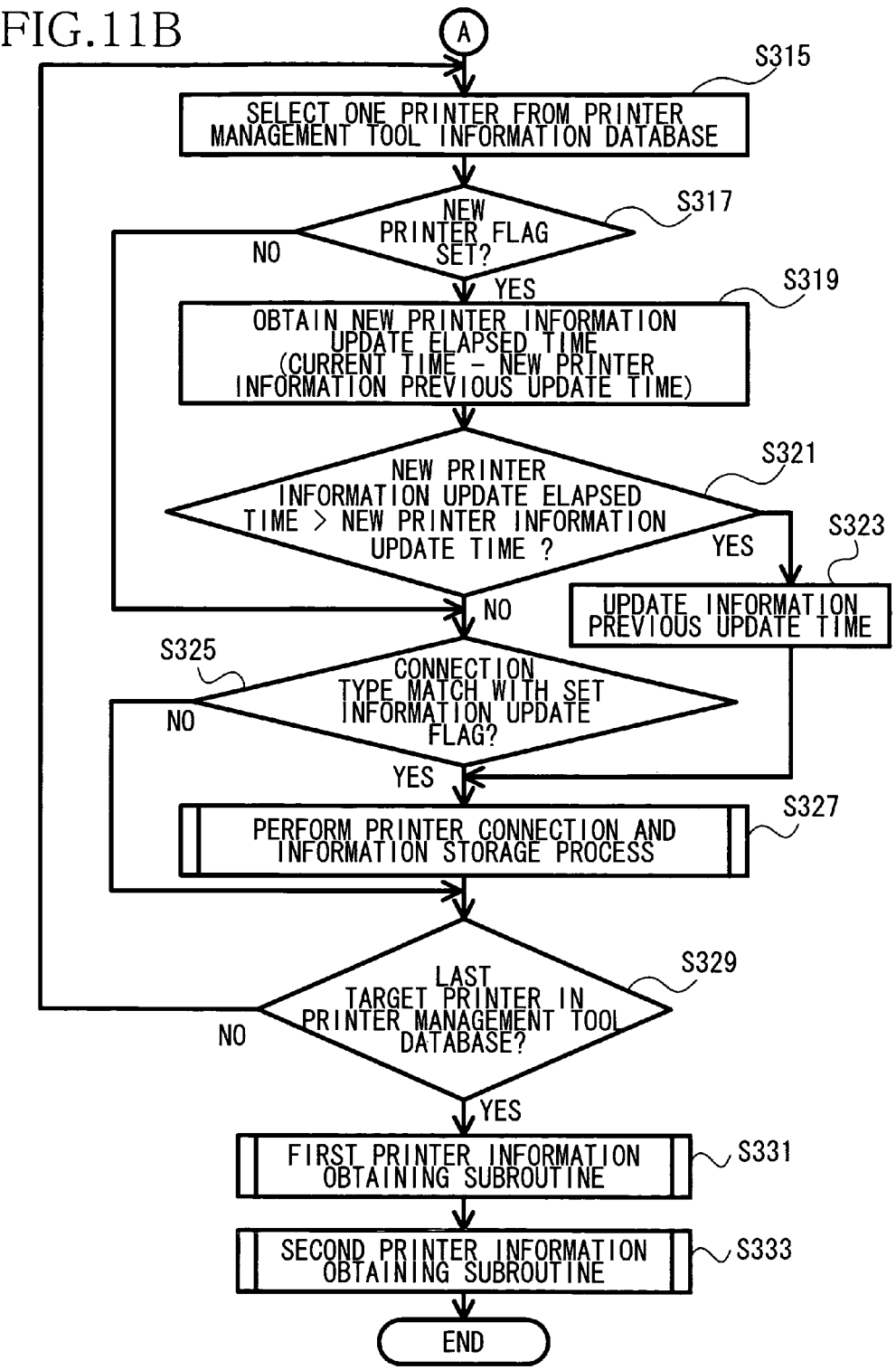

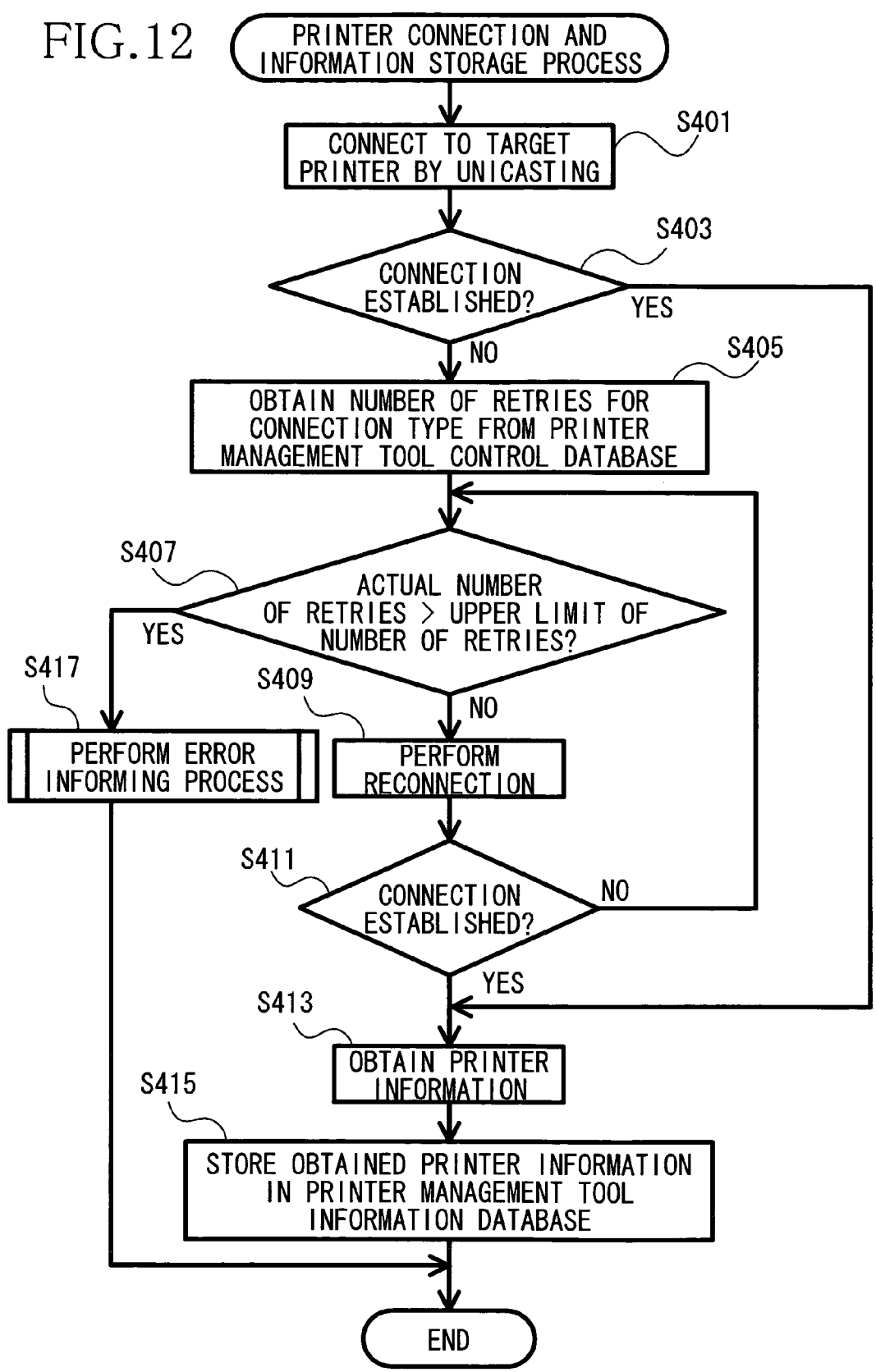

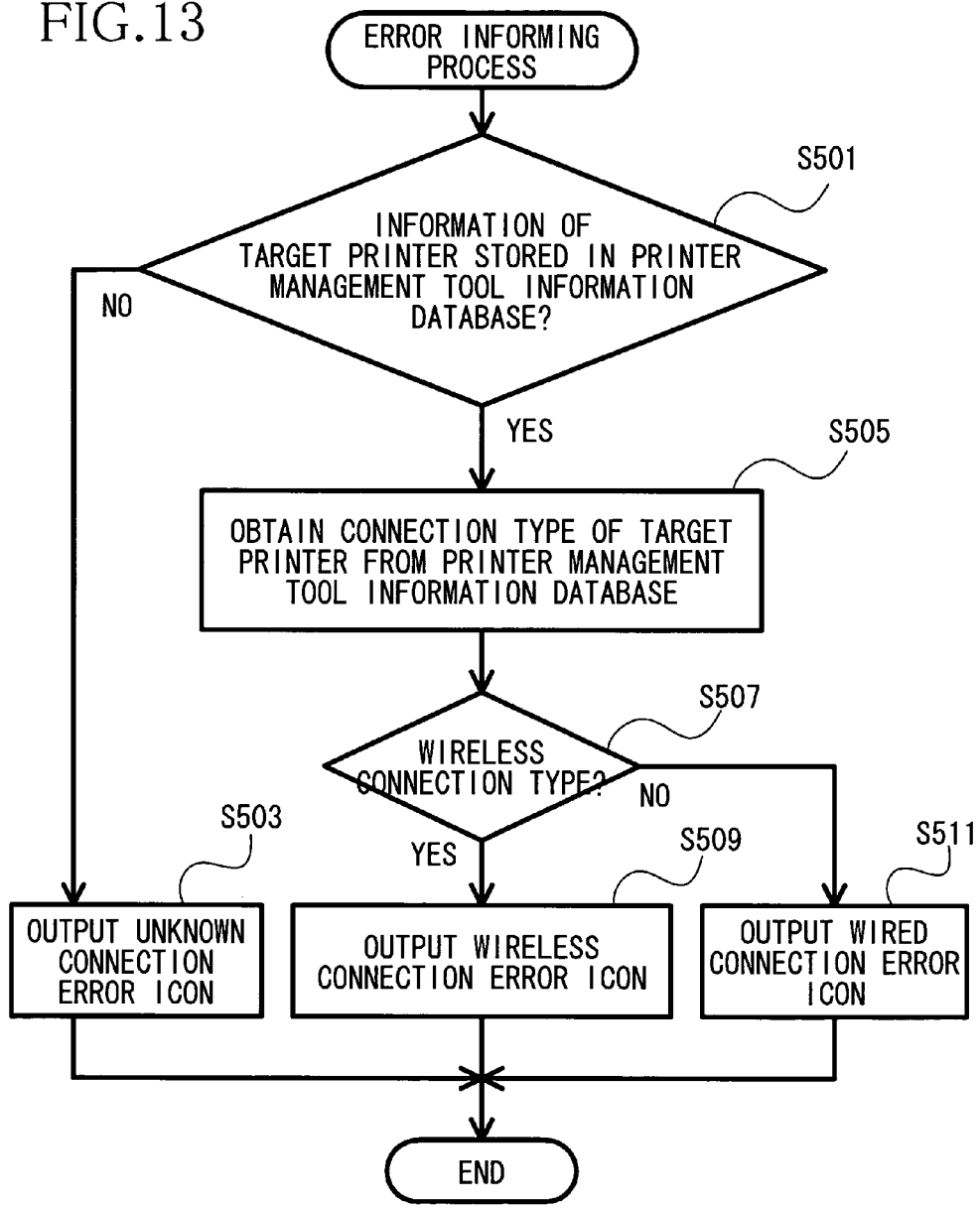

FIG.15

| SSID | PRINTER NODE NAME LIST |
|---|---|
| Brothe_1 | PrinterA |
| Brothe_2 | Printer1 |

FIG.21
| RADIO FIELD STRENGTH | STRONG | MODERATE | WEAK |
|---|---|---|---|
| ICON | 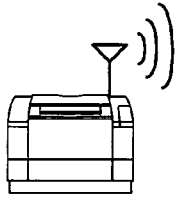 |  | 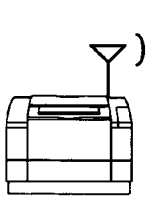 |

FIG.24

```
Configure BRN_123456

| Wireless Device Setup |

Current Status

Operating Mode        802.11g
        Channel               11
        Radio Field Strength  2

Communication Mode       [Infrastructure    ▼]
        Wireless Network Name (SSID)  [Brothe          ]    [Browse]
        Channel                       [11              ]

Authentication Method    [Open System       ▼]
        Encryption Mode          [WEP               ▼]
        Network Key
            ⊙ WEP Key1    [xxxxxxxxxx                    ]
            ○ WEP Key2    [                              ]
            ○ WEP Key3    [                              ]
            ○ WEP Key4    [                              ]

[ Test ]

[ OK ]   [ Cancel ]   [ Help ]
```

NETWORK DEVICE MANAGEMENT SYSTEM, NETWORK DEVICE MANAGEMENT DEVICE, AND NETWORK DEVICE MANAGEMENT PROGRAM

INCORPORATION BY REFERENCE

This application claims priority from JP 2003-365153, filed Oct. 24, 2003, the subject matter of which is incorporated herein in its entirety by reference thereto.

BACKGROUND OF THE INVENTION

1. Field of Invention

The invention relates to a network device management system, a network device management device, and a network device management program.

2. Description of Related Art

Japanese Laid-Open Patent Publication No. 11-027285 discloses a system wherein a computer on a network manages and displays information about various network devices including network-ready printers.

In the office environment, recently, a wireless network environment has become common as well as a wired network environment. Further, printers which are wirelessly connected to networks (hereinafter, referred to as wireless printers) are on the market. Japanese Laid-Open Patent Publication No. 2002-264431 discloses a system wherein a terminal device manages and displays information about wireless printers.

SUMMARY OF THE INVENTION

However, Japanese Laid-Open Patent Publication No. 11-027285 does not provide a system to distinguish whether the network device is a wired connection type or a wireless connection type. Therefore, when the information about the network-ready printer is displayed on the computer, a connection type of the network-ready printer cannot be displayed, so that the information as to whether the network-ready printer is a wired connection type or a wireless connection type cannot be indicated.

Japanese Laid-Open Patent Publication No. 2002-264431 discloses the system wherein only the information about the wireless printers is displayed. Therefore, information about a printer which is connected to the network by a cable (hereinafter, referred to as a wired printer) is not a candidate for display. Thus, the information about the wired printer cannot be displayed on the system. As a matter of course, a connection type of the printer cannot be displayed, so that the information as to whether the printer is a wired connection type or a wireless connection type cannot be indicated.

The invention provides a network device management system, a network device management device and a network device management program that can provide a user with information about a network connection type, whether a network device is a wired connection type or a wireless connection type.

According to one aspect of the invention, a network device management system includes a computer that is connected to at least one network and a network device that is connected to the network and is capable of communicating with the computer via the network. Each network device includes a network device controller that provides the computer with network device information about settings and conditions of each network device of the at least one network device, via the network. Each network device information includes connection type information that indicates whether each network device is a wired connection type or a wireless connection type. The computer includes a computer controller that obtains the network device information from each network device via the network and outputs a part or all of the contents of the network device information including at least the connection type information, based on the obtained network device information.

In the network device management system, the network device controller provides the network device information to the computer. Then, the computer controller obtains the network device information. Based on the obtained device information, the computer controller outputs a part or all of the network device information including at least the connection type information.

The network device information is outputted in various ways. The information may be outputted as a data file in a displayable or printable format, displayed on a display device, or printed by an image forming device. In each way, the user can obtain the network device information. Accordingly, the user can easily identify the connection type of the network device whether it is the wired connection type or the wireless connection type.

According to another aspect of the invention, a network device management device includes a computer that can communicate with a network device via a network. The computer includes a controller that obtains, via the network, network information about settings and conditions of the network device. The network information includes connection type information that indicates whether the connection type is a wired connection or a wireless connection. The controller further outputs a part or all of the contents of the network device information, including at least the connection type information, based on the obtained network device information.

In the network device management device, the controller obtains the network device information. Based on the obtained device information, the controller outputs a part or all of the network device information including at least the connection type information. The network device information is outputted in various ways as discussed above.

According to a further aspect of the invention, a program product for use in a computer, functioning as a network administrator device, which is capable of communicating with a network device via the computer, causes the computer to execute the step of obtaining, via the network, network information about settings and conditions of the network device. The network information includes connection type information that indicates whether the connection type is a wired connection or a wireless connection. The program product further causes the computer to execute the step of outputting a part or all of the contents of the network device information including at least the connection type information, based on the obtained network device information.

Accordingly, the program product causes the computer to execute the step of obtaining the network device information. Based on the obtained device information, the computer executes the step of outputting a part or all of the network device information including at least the connection type information. That network device information is outputted in various ways as discussed above.

BRIEF DESCRIPTION OF THE DRAWINGS

An exemplary embodiment of the invention will be described in detail with reference to the following figures wherein:

FIG. 3A is a data structure diagram of a printer information database;

FIG. 3B is a data structure diagram of a wireless LAN printer information database;

FIG. 3C is a data structure diagram of a Bluetooth printer information database;

FIG. 4 is a data structure diagram of a printer management tool information database;

FIG. 5 is a diagram showing a display example of printer information to be provided to a user;

FIG. 6 is a data structure diagram of a printer management tool control database;

FIG. 7 is a diagram showing icons stored in a printer management tool icon database;

FIG. 8 is a data structure diagram of a printer management tool wireless connection information database;

FIG. 11B is a continuation of the flowchart of the printer information obtaining process of FIG. 11A;

FIG. 12 is a flowchart of a printer connection and information storage process;

FIG. 13 is a flowchart of an error informing process;

FIG. 15 is a data structure diagram of a printer list;

FIG. 21 is a diagram showing icons stored in a printer management tool radio field strength icon database;

FIG. 24 is a diagram showing a wireless printer setting screen; and

DETAILED DESCRIPTION OF PREFERRED EMBODIMENTS

Figure 1:
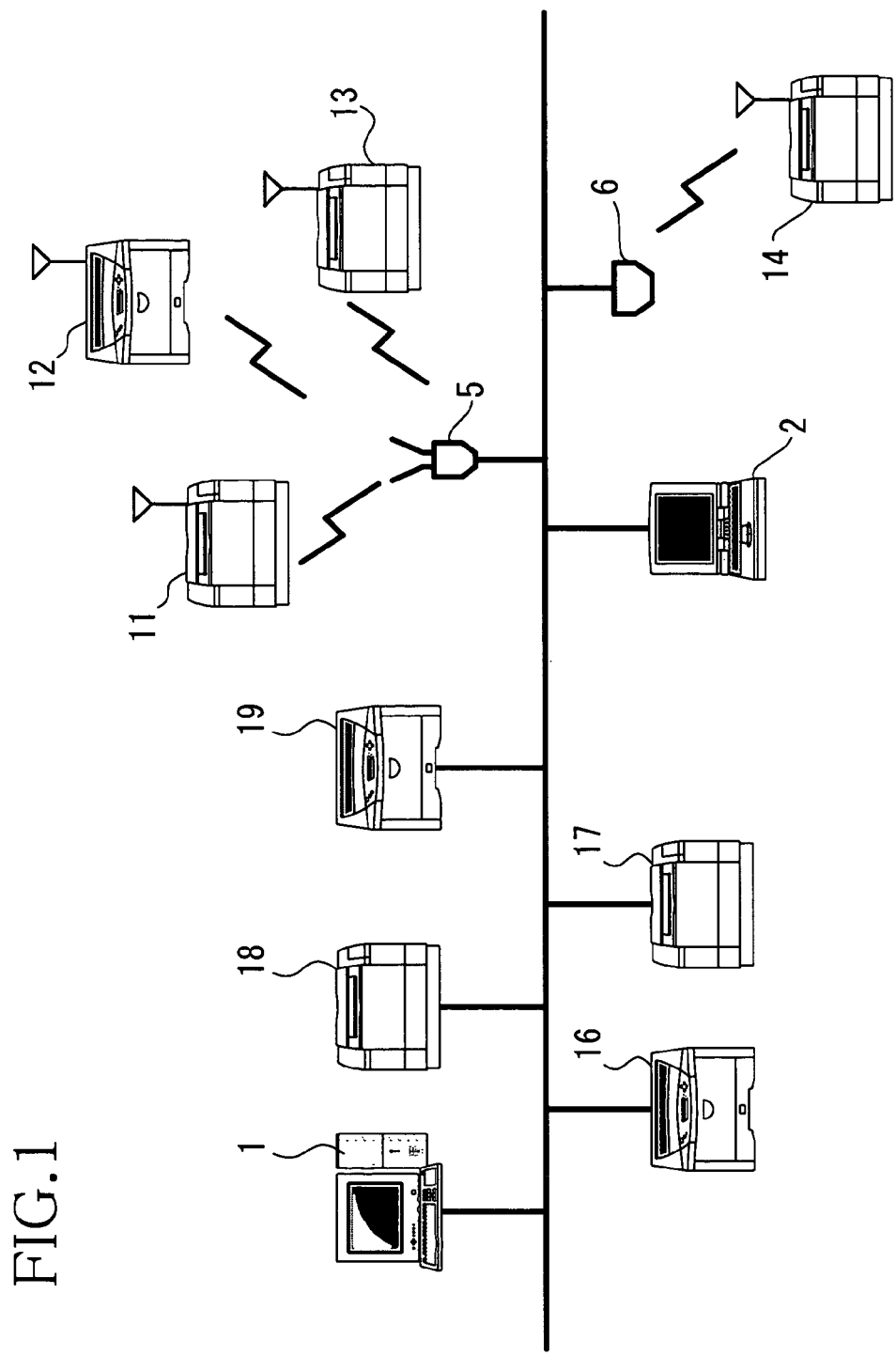
FIG. 1 shows a configuration diagram of a network device management system of an exemplary embodiment of the invention.

As shown in FIG. 1, a network device management system of the exemplary embodiment includes a server 1 that manages printer information, a personal computer (PC) 2 that can display thereon information provided from the server 1, access points 5, 6 that interconnect a wired LAN side and a wireless LAN side, and multifunctional machines 11 to 14, 16 to 19, each of which has a printing function, an image scanning function, a facsimile function and a copying function. The server 1 functions as a computer or an administration server. The PC 2 functions as a client computer including a browser. The multifunctional machines 11 to 14, 16 to 19 function as network devices.

The server 1, the PC 2, the access points 5, 6 and the multifunctional machines 16 to 19, are connected with each other via LAN cables to establish a network (a wired LAN). The multifunctional machines 11 to 13 establish wireless connection with the access point 5 by a wireless LAN system based on the IEEE802.11 family standard, and are connected to the wired LAN via the access point 5. The multifunctional machine 14 establishes wireless connection with the access point 6 by the Bluetooth (registered trademark) standard, and is connected to the wired LAN via the access point 6.

Figure 2:
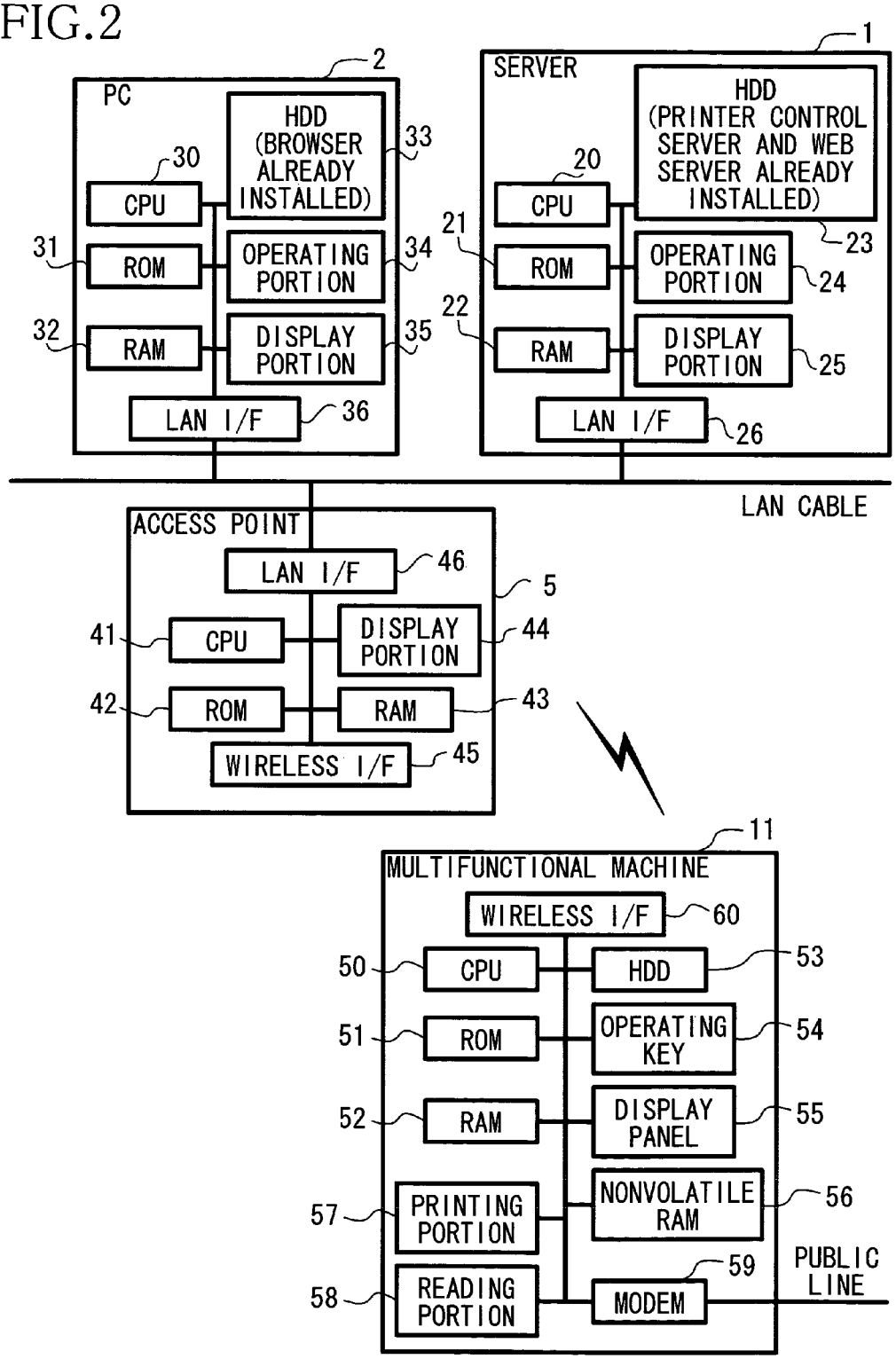
FIG. 2 is a block diagram showing internal structures of a personal computer, a server, an access point and a multifunctional machine constituting the network device management system.

As shown in FIG. 2, the server 1 includes a personal computer that includes a CPU 20, a ROM 21, a RAM 22, a hard disk drive (HDD) 23, an operating portion 24, a display portion 25, and a LAN interface (I/F) 26. The CPU 20 controls the portions of the server 1 and performs various operations in accordance with a control program stored in the ROM 21. The ROM 21 stores various data as well as the control program. The RAM 22 temporarily stores various data therein. The hard disk drive 23 stores various application programs and data files to be used in the server 1. The operating portion 24 includes a keyboard and various pointing devices (e.g. a mouse). The display portion 25 includes a liquid crystal display or equivalent display, such as CRT or plasma, that can display a color image thereon. The LAN interface 26 allows the server 1 to establish a wired connection to the network via the LAN cable.

The server 1 is equipped with an operating system, such as Windows (registered trademark), Linux (registered trademark) or MacOS (registered trademark). The operating system performs basic tasks, such as recognizing input from the keyboard, sending output to a display screen, commanding the performance of communications to the LAN interface 26, controlling input/output operations, and allocating storage, including a memory and hard disk space, which are shared between the applications. A program called as a printer management server or a printer management tool is installed on the server 1. The program functions as a network device information management program. The server 1 functions as a network device information management device by performing processing according to the program (detail of which will be described later). Further, a program that provides a web server function is installed on the server 1. By performing processing according to the program, the server 1 can provide the PC 2, which is a client, with a file created by a printer management server function, in response to a request made by a browser (a client program) provided in the PC 2.

The PC 2 basically has a hardware structure similar to the server 1. The PC 2 includes a CPU 30, a ROM 31, a RAM 32, a hard disk drive (HDD) 33, an operating portion 34, a display portion 35, and a LAN interface (I/F) 36. The CPU 30 controls the portions of the PC 2 and performs various operations in accordance with a control program stored in the ROM 31. The ROM 31 stores various data as well as the control program. The RAM 32 temporarily stores various data therein. The hard disk drive 33 stores various application programs and data files to be used in the PC 2. The operating portion 34 includes a keyboard and various pointing devices (e.g. a mouse). The display portion 35 includes a liquid crystal display, or other display, such as CRT or plasma, that can display a color image thereon. The LAN interface 36 allows the PC 2 to establish a wired connection to the network via the LAN cable.

The PC 2 is also equipped with an operating system, such as Windows, Linux or MacOS (all registered Trademarks). The operating system performs basic tasks, such as recognizing input from a keyboard, sending output to a display screen, commanding the performance of communications to the LAN interface 36, controlling input/output operations, and allocating storage, including a memory and hard disk space, which are shared between the applications. A browser program is installed on the PC 2. By performing processing according to the browser program, the PC 2 requests the server 1 to provide a file. In addition, the PC 2 can display or store the file provided in response to the request, according to its file format.

The access point 5 includes a CPU 41, ROM 42, RAM 43, a display portion 44, a wireless interface (I/F) 45 and a LAN interface (I/F) 46. The CPU 41 controls the portions of the access point 5 and performs various operations in accordance with a control program stored in the ROM 42. The ROM 42 stores various data as well as the control program. The RAM 43 temporarily stores various data therein. The display portion 44 includes a small-sized liquid crystal display, or equivalent display, and displays thereon brief information, such as settings and conditions of the access point 5. The wireless interface 45 is provided to perform data communications with the multifunctional machines 11 to 13 by the wireless LAN system based on the IEEE802.11 family standard. Although described using the IEEE802.11 family standard, other standards could be used as currently known or as developed at a future date. The LAN interface 46 allows the access point 5 to establish a wired connection to the wired LAN via the LAN cable and to perform data communications with the multifunctional machines 16 to 19.

The multifunctional machine 11 includes a CPU 50, a ROM 51, a RAM 52, a hard disk drive (HDD) 53, an operating key 54, a display panel 55, a nonvolatile RAM 56, a printing portion 57, a reading portion 58, a modem 59 and a wireless interface (I/F) 60. The CPU 50 controls the portions of the multifunctional machine 11 and performs various operations in accordance with a control program stored in the ROM 51. The ROM 51 stores various data as well as the control program. The RAM 52 temporarily stores various data obtained during processing by the CPU 50. The hard disk drive 53 is a memory that stores relatively large-sized image data, such as an image to be transmitted or received by the facsimile function, an image read by the image scanning function, and an image to be printed by the printing function. The operating key 54 is operated when basic commands are issued to the multifunctional machine 11. The display panel 55 includes a small-sized liquid crystal display and displays information, such as settings and conditions of the multifunctional machine 11. The nonvolatile RAM 56 stores data, such as the settings of the multifunctional machine 11, which is desired not to be erased when the power supplied to the multifunctional machine 11 is cut off. Connection setting information, which is needed to make the multifunctional machine 11 establish a wireless connection with the access point 5, is stored in the nonvolatile RAM 56. The printing portion 57 performs printing onto a recording medium, such as paper, and operates when print data is printed by the printing function, a received image is printed by the facsimile function, or a copy image is printed by the copying function. The reading portion 58 reads an image from a document placed on an automatic document feeder (not shown) or a flatbed contact glass and operates when an image is read by the image scanning function or an image to be transmitted is read by the facsimile function. The modem 59 performs voice or data communications with a device outside the network via a public line and operates when an image is transmitted or received by the facsimile function or a telephone conversation is performed using the telephone function. The wireless interface 60 is provided to perform data communications with the access point 5 by the wireless LAN system based on the IEEE802.11 family standard.

Although having a different communications standard from the access point 5, the access point 6 basically has a hardware structure similar to the access point 5. Therefore, drawings for the internal structure of the access point 6 will be omitted. The multifunctional machines 12, 13 have a structure identical to the multifunctional machine 11. Although having a different network connection system (=a connection type, (i.e., a wired connection or a wireless connection) and, when appropriate, a wireless connection standard (as described herein the IEEE802.11 family standard or Bluetooth standard)) from the multifunctional machine 11, the multifunctional machines 14, 16 to 19 have a structure similar to the multifunctional machine 11 except for portions related to the network connection system. Accordingly, the drawings of the internal structures of the multifunctional machines 14, 16 to 19 will be also omitted.

Next, various information managed by the server 1 and the multifunctional machines 11 to 14, 16 to 19 in the network device management system will be described. In this exemplary embodiment, the multifunctional machines 11 to 14, 16 to 19 are targeted for management. However, this network device management system can handle printers as the targets, in addition to the multifunctional machines 11 to 14, 16 to 19, so that both the multifunctional machines 11 to 14, 16 to 19 and the printers will be used in the description below.

In the network device management system, the printers (the multifunctional machines 11 to 14, 16 to 19 in this exemplary embodiment) to be managed, can provide the server 1 with information about their own settings and conditions via an SNMP (Simple Network Management Protocol). The SNMP monitors and controls network-connected managed devices by a managing device, via a network, in a TCP/IP network. The server 1 functions as the managing device, and the multifunctional machines 11 to 14, 16 to 19 function as the managed devices.

Each multifunctional machine 11 to 14, 16 to 19 is provided with a printer information database (which is also called as Management Information Base (MIB) in the SNMP) having a structure as shown in FIG. 3A. The printer information database includes, as information about a network connection of the multifunctional machine 11 to 14, 16 to 19, a connection type (0: wired connection, 1: wireless LAN connection, 2: Bluetooth connection), a printer node name (any character string), a MAC (Media Access Control) address (a unique identification number assigned to each multifunctional machine 11 to 14, 16 to 19), and an IP (Internet Protocol) address (a logical address on the network).

Each multifunctional machine 11 to 13 based on the IEEE802.11 family wireless LAN standard, is provided with a wireless LAN printer information database having a structure as shown in FIG. 3B. The wireless LAN printer information database includes, as information about a wireless LAN connection of the multifunctional machine 11 to 13, a radio field strength (extremely weak/weak/moderate/strong), a communication quality (bad/good), an SSID (any character string), and a threshold level (a level of the radio field strength at which a warning is required to be issued: extremely weak, weak, moderate). The data of the radio field strength and the communication quality are constantly updated by the multifunctional machines 11 to 13.

The multifunctional machine 14 is provided with a Bluetooth printer information database having a structure as shown in FIG. 3C. The Bluetooth printer information database includes, as information about a Bluetooth connection of the multifunctional machine 14, a radio field strength (extremely weak/weak/moderate/strong), a communication quality (bad/good), a device address (a unique identification number assigned to the multifunctional machine 14) and a threshold level (a level of the radio field strength at which a warning is required to be issued: extremely weak, weak, moderate). The data of the radio field strength and the communication quality are constantly updated by the multifunctional machine 14.

The radio field strength is obtained when communication is performed between the multifunctional machine 11, 12 13 and the access point 5 or between the multifunctional machine 14 and the access point 6. In the wireless communication, commonly, if the radio field strength is weak, a data error is likely to occur. In order to avoid this error, the communication speed needs to be slowed. Thus, in the wireless communication, a high-speed communication cannot be performed under a condition where the radio field strength is weak.

The wireless LAN printer information database stores the information, such as "extremely weak", "weak", "moderate", or "strong", as the radio field strength. For example, when a multifunctional machine includes a wireless LAN module having a communication sensitivity between −91 dBm and −83 dBm, a sensitivity of between −91 dBm and −89 dBm is indicated by "extremely weak", a sensitivity of between −88 dBm and −87 dBm is indicated by "weak", a sensitivity of between −86 dBm and −85 dBm is indicated by "moderate", and a sensitivity of between −84 dBm and −83 dBm is indicated by "strong". The measured result of the radio field strength is stored in the wireless LAN printer information database.

The server (the managing device) 1 requests the multifunctional machines (the managed devices) 11 to 14, 16 to 19, to provide the server 1 with the information stored in their printer information databases, the wireless LAN printer information databases, and the Bluetooth printer information databases, via the SNMP. In response to the request, the multifunctional machines 11 to 14, 16 to 19 provide the server 1 with the information stored in the printer information databases, the wireless LAN printer information databases, and the Bluetooth printer information databases.

As the server 1 obtains the information from the multifunctional machines 11 to 14, 16 to 19, the server 1 stores the obtained information into a printer management tool information database having a structure as shown in FIG. 4. The printer management tool information database includes the information of each printer (each multifunctional machine 11 to 14, 16 to 19 in this exemplary embodiment) on the network, such as the printer node name, the MAC address, the IP address, the connection type, the radio field strength, the communication quality, the SSID, the device address, a new printer flag, a new registration time, a receiving level warning flag, and the threshold level.

In the exemplary embodiment, as the connection type to be stored in the printer management tool database, the information of the connection type provided by the printer (the multifunctional machine 11 to 14, 16 to 19) is stored just as it is. However, it is not limited to the exemplary embodiment. The connection type may be comprehensively judged with consideration given to not only the connection type provided by the printer but also the other information about the printer, and then, the judgment result may be stored in the printer management tool information database, as the connection type of the printer. For example, when the server 1 received either of a radio field strength or a communication quality from the printer, it may be judged that the connection type is either of a wireless LAN connection or a Bluetooth connection. When the server 1 did not receive both of the radio field strength and the communication quality, it may be judged that the connection type is a wired LAN connection. Then, a further judgment is made whether the received information includes an SSID. When the server 1 received an SSID in addition to either of the radio field strength or the communication quality, it may be judged that the connection type is a wireless LAN connection. When the server 1 did not receive the SSID in addition to either of the radio field strength or the communication quality, it may be judged that the connection type is a Bluetooth connection.

Upon receipt of a request for information from a client (e.g. the browser of PC 2), the server 1 reads the information from the printer management tool information database (FIG. 4), converts the read information into a file in a format suitable for provision to users (e.g. a file in an HTML format), and provides the file to the PC 2. The file provided to the PC 2 is displayed by the browser of the PC 2. FIG. 5 shows a display image of the file displayed by the browser of the PC 2. The display image includes an icon indicating a connecting condition, the printer node name, the MAC address, the IP address, the radio field strength, the communication quality, the connection type, and the SSID of each printer, and displays the information in a list in order from the left. In this exemplary embodiment, that is, not all, but a part of the information stored in the printer management tool information database of FIG. 4 is shown in the list in addition to icons (described later) selected in accordance with the information.

The server 1 is provided with a printer management tool control database having the structure shown in FIG. 6. The printer management tool control database includes an information update time (under normal conditions), an information update time (during the occurrence of a connection error), an information update time (during the warning of a receiving level), a new printer information update time, a new printer existing time, a connection timeout period, the number of retries, and an information previous update time. In this database, each item can be set on a connection-type basis (the wired connection/the wireless connection).

Further, the server 1 is provided with a printer management tool icon database as shown in FIG. 7. The printer management tool icon database includes six types of icons which represent six different conditions that are expressed by combinations of three patterns of the connection type (a wired connection/a wireless connection/unknown) and two statuses of the communication quality (bad/good). These icons are used in the file for screen display of FIG. 5, as a part of the file. Other icons conveying a similar impression can be used. That is, when creating the file for screen display of FIG. 5, the server 1 identifies the connection type (a wired connection/a wireless connection/unknown) and the communication quality (bad/good) printer-by-printer, with reference to the information read from the printer management tool information database. Then, the server 1 selects appropriate icons, each of which represents the identified connection type and communication quality, from the printer management tool icon database, and creates the file for screen display including the selected icons which are displayed printer-by-printer.

The server 1 is further provided with a printer management tool wireless connection information database as shown in FIG. 8. The printer management tool wireless connection information database includes information, such as the SSID and the communication quality, on a printer-node-name basis.

Next, a printer information update process, to be executed by the server 1 in the network device management system, will be described with reference to FIGS. 9 to 15. The printer information update process starts when the power of the server 1 is turned on.

Figure 10:
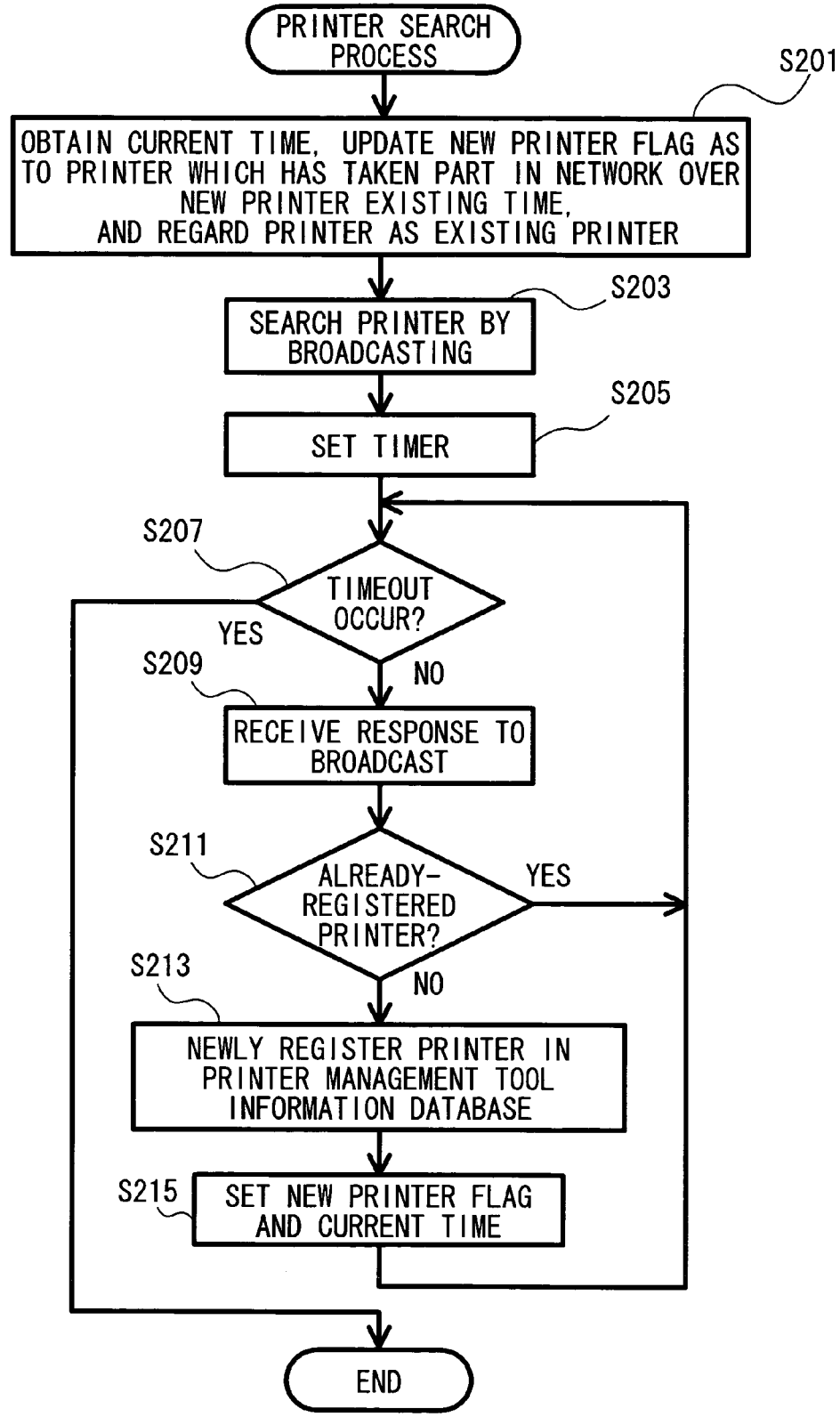
FIG. 10 is a flowchart of a printer search process.

When the printer information update process starts, the server 1 executes a printer search process (S101). FIG. 10 shows details of the printer search process.

When the printer search process starts, the server 1 obtains a current time. As to a printer which has taken part in the network over the new printer existing time, a new printer flag of the printer is updated and the printer is thus regarded as an existing printer (S201). A new printer refers to a printer whose network participating time (which is a duration that the printer has taken part in the network) has not passed a certain time since the printer established the connection to the network. An existing printer refers to a printer whose network participating time has passed the certain time since the printer established the connection to the network. The certain time is stored, in the printer management tool control database (FIG. 6), as the new printer existing time. The new printer existing time refers to a time period over which a printer newly connected to the network is regarded as a new printer. In the printer management tool control database, different time periods can be set as the new printer existing time by connection type (the wired connection/the wireless connection). In this exemplary embodiment, a time period of 300 seconds is set as the new printer existing time for both the wired and wireless connection types. In the printer management tool information database (FIG. 4), the new registration time is stored printer-by-printer. For the existing printer, the new registration time is zero (0). For the new printer, the new registration time is indicated by a value representing a time at which the server 1 recognized the existence of the new printer on the network. Then, the relationship between the new registration time, the current time and the new printer existing time are determined. When a value, which is obtained by subtracting the new registration time from the current time, is larger than the new printer existing time ((Current time−New registration time) >New printer existing time)), the new printer flag of the printer is updated. The new printer flag is one of the items stored in the printer management tool information database (FIG. 4). When the printer is a new printer, the new printer flag is set to one (1). When the printer is an existing printer, the new printer flag is set to zero (0). In this process, as to the printer which is the target of update of the new printer flag, its new printer flag is updated from one (1) to zero (0). Thus, the printer is treated as an existing printer after that.

Then, the server 1 performs a printer search by broadcasting (S203). This process is performed on all the printers currently connected to the network, in order to request the target printers to provide their responses to the server 1. A time period for waiting for the responses from the target printers (e.g. 30 seconds) is set to a timer (S205), and it is determined-whether a timeout has occurred (S207).

When a timeout has not occurred (S207:NO), the server 1 receives a response to the broadcast made at S203 (S209). Then, it is determined whether the response is sent back from an already-registered printer (S211). The already-registered printer refers to a printer that has already been registered and listed in the printer management tool information database (FIG. 4). It can be determined whether the printer is an already-registered printer by referring to the printer management tool information database.

When the printer which sent back the response to the server 1 is an already-registered printer (S211:YES), flow goes back to S207. When the printer which sent back the response to the server 1 is not an already-registered printer, that is, the printer is a new printer (S211:NO), the printer is newly registered in the printer management tool information database (S213). In the information newly stored in the printer management tool information database at S213, the new printer flag of the newly registered printer is set to one (1) which represents a new printer, and the current time is set to the new registration time (S215). Then, flow goes back to S207.

Until the timeout occurs (S207:NO), S207 to S215 are repeatedly performed and the presence of the printers which are currently connected to the network can be searched as much as possible. When the timeout occurs (S207:YES), the printer search process of FIG. 10 is finished.

Figure 9:
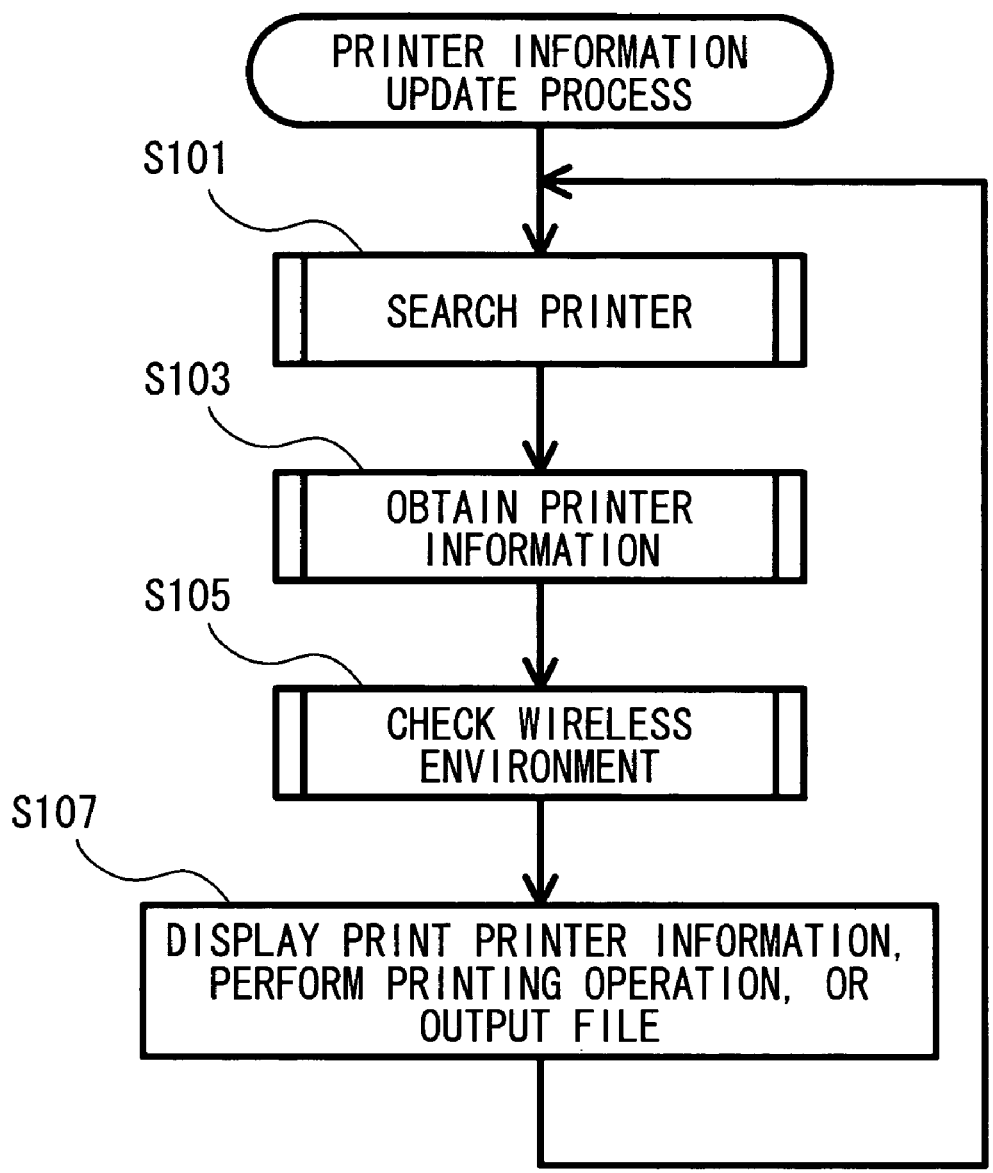
FIG. 9 is a flowchart of a printer information update process.
Figure 11A:
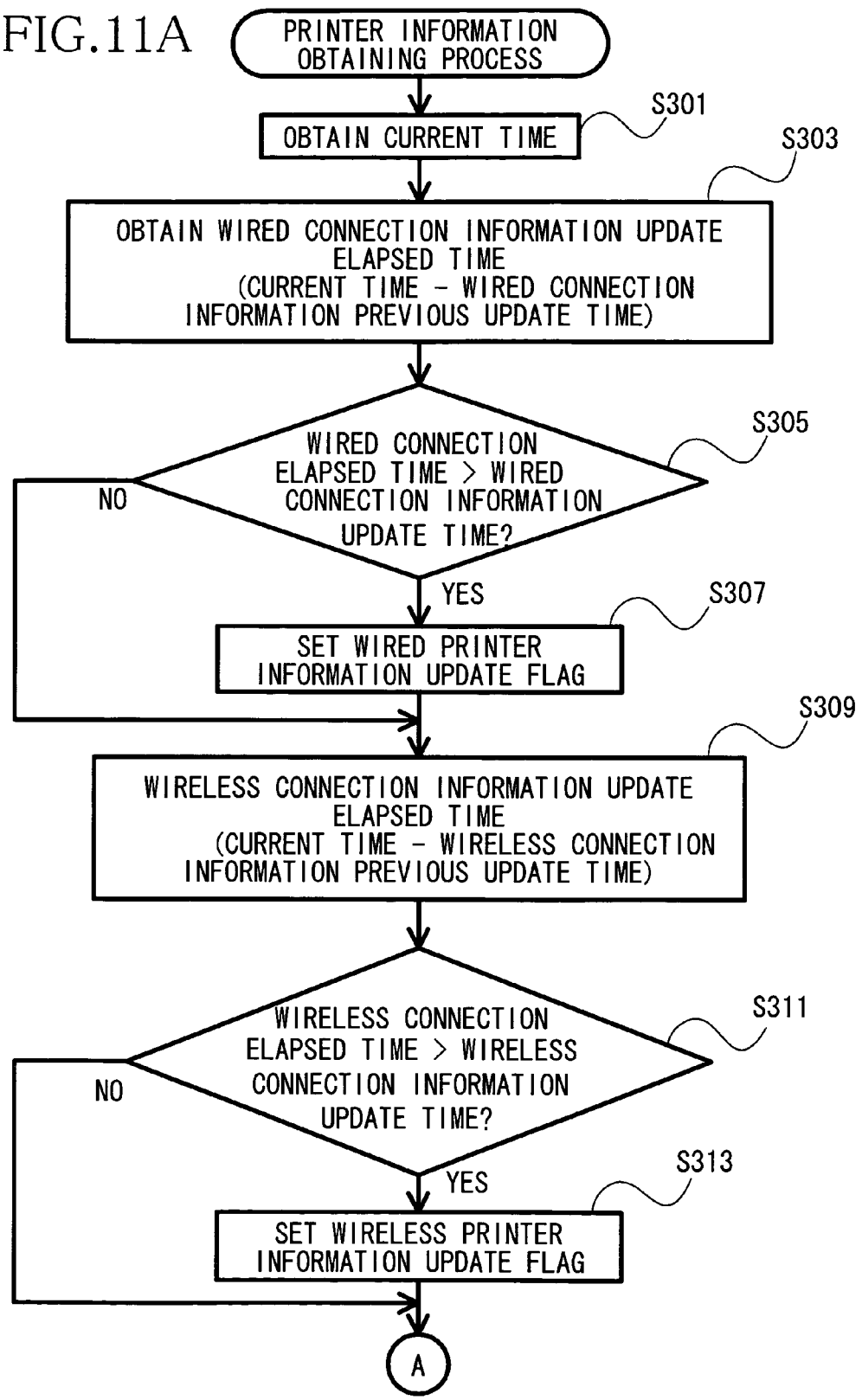
FIG. 11A is a flowchart of a printer information obtaining process.

When S201 to S215 of FIG. 10 are finished, S101 of FIG. 9 is completed. Then, the server 1 performs a printer information obtaining process (S103) of FIG. 9. FIGS. 11A and 11B show details of the printer information obtaining process.

When the printer information obtaining process starts, a current time (S301) and a wired connection information update elapsed time (S303) are obtained. The wired connection information update elapsed time refers to a time that has elapsed after the information of wired connection type printers (hereinafter, referred to as wired printers) was previously updated (a wired connection information previous update time). The wired connection information update elapsed time is obtained by subtracting the wired connection information previous update time from the current time (Wired connection information update elapsed time=Current time−Wired connection information previous update time). The wired connection information previous update time refers to a time at which the information of the wired printers stored in the printer management tool information database was previously updated. In FIG. 6, the wired connection information previous update time is indicated in the first data line of an information previous update time column of the printer management tool information database.

When the wired connection information update elapsed time obtained at S303 exceeds a wired connection information update (S305:YES), a wired printer information update flag is set, that is, the information needs to be updated (S307). In FIG. 6, the wired connection information update time is indicated in the first data line of the information update time (under normal conditions) column of the printer management tool information database. In this exemplary embodiment, a time of 300 seconds is set to the wired connection information update time. When the wired connection information update elapsed time does not exceed the wired connection information update time, that is, the information does not need to be updated (S305:NO), flow moves to S309. The wired printer information update flag is set in a memory (the RAM 22) during the execution of this process, and is to be referred to at S325 to determine whether S327 is to be performed.

Then, a wireless connection information update elapsed time (S309) is obtained. The wireless connection information update elapsed time refers to a time that has elapsed after the information of wireless connection type printers (hereinafter referred to as wireless printers) was previously updated (a wireless connection information previous update time). The wireless connection information update elapsed time is obtained by subtracting the wireless connection information previous update time from the current time (Wireless connection information update elapsed time=Current time−Wireless connection information previous update time). The wireless connection information previous update time refers to a time at which the information of the wired printers stored in the printer management tool information database was previously updated. In FIG. 6, the wireless connection information previous update time is indicated in the second data line of the information previous update time column of the printer management tool information database.

When the wireless connection information update elapsed time obtained at S309 exceeds a wireless connection information update time (S311:YES), a wireless printer information update flag is set (S313). In FIG. 6, the wireless connection information update time is indicated in the second data line of the information update time (under normal conditions) of the printer management tool control database. In this exemplary embodiment, a time of 30 seconds is set to the wireless connection information update time. That is, the information of the wireless printers is updated every 30 seconds, and that of the wired printers is updated every 300 seconds. The frequency of the information update of the wireless printers is ten times as often as that of the wired printers. When the wireless connection information update elapsed time does not exceed the wireless connection information update time (S311:NO), flow moves to S315. The wireless printer information update flag is set in the memory (the RAM 22) during the execution of this process, and is to be referred to at S325 to determine whether S327 is to be performed. As described above, the different time intervals of obtaining the information are set to the wireless printers and the wired printers. More preferably, the time interval of obtaining the information of the wireless printers is set to be shorter than that of the wired printers.

Then, one of the printers is selected from the printer management tool information database (FIG. 4) (S315). The following steps are performed on the information of the printer selected at S315. First, it is determined whether the new printer flag of the selected printer (the target printer) has been set (S317).

When the new printer flag has been set, i.e., the selected printer is a new printer (S317:YES), a new printer information update elapsed time is obtained (S319). The new printer information update elapsed time refers to a time that has elapsed after the information of a new printer was previously updated. The new printer information update elapsed time is obtained by subtracting the new printer information previous update time from the current time (New printer information update elapsed time=Current time−New printer information previous update time). The new printer previous update time refers to a time at which the information of the new printer stored in the printer management tool information database was previously updated. When the new printer information update elapsed time obtained at S319 exceeds the new printer information update elapsed time (S321:YES), the information from the previous update time is updated (S323).

At S317, when the new printer flag has not been set (S317:NO), flow moves to S325. When the new printer information update elapsed time obtained at S319 does not exceed the new printer information update time (S321:NO), flow moves to S325. As described above, the interval of obtaining the information of the new printer is specially set, preferably, is shortened.

At S325, it is determined whether the connection type of the target printer matches with the set information update flag. The connection type of the target printer has been stored in the printer management tool information database (FIG. 4). The information update flag has been set if S307 or S313 was performed. At S325, when the wired connection information update flag has been set at S307 and the connection type of the target printer stored in the printer management tool information database is zero (0) (the wired connection), and when the wireless connection information update flag has been set at S313 and the connection type of the target printer stored in the printer management tool information database is not zero (0) (e.g., 1: wireless LAN connection, 2: Bluetooth connection), it is determined that the connection type of the target printer matches with the set information update flag.

When the connection type matches with the set information update flag (S325:YES), flow moves to S327. After S323 is finished, flow also moves to S327.

At S327, a printer connection and information storage process is performed. FIG. 12 shows details of the printer connection and information storage process.

When the printer connection and information storage process starts, the server 1 establishes a connection with the target printer by unicasting (S401). The printer subjected to be connected by the server 1 is the printer selected at S315 of FIG. 11B.

Then, it is determined whether the connection has been established therebetween (S403). When the connection is not established (S403:NO), an upper limit of the number of retries for the connection type of the target printer is obtained from the printer management tool control database (FIG. 6) (S405). When the number of times the retry has been actually performed is not greater than the obtained upper limit of the number of retries (S407:NO), reconnection is performed (S409). Then, it is again determined whether the connection has been established therebetween (S411). In this exemplary embodiment, the upper limit of the number of retries is zero times for the wired connection type and twice for the wireless connection type. A connection error occurring in the wired connection environment is rarely likely to be recovered by retry. On the other hand, a connection error occurring in the wireless connection environment is mostly recovered by a retry in accordance with changes of the radio environment.

When the connection has been established therebetween through S401 to S411 (S403:YES or S411:YES), the printer information is obtained from the target printer via the SNMP (S413). The obtained information is then stored in the printer management tool information database (S415), and the printer connection and information storage process is finished.

At S407, when the number of times the retry has been actually performed is greater than the obtained upper limit of the number of retries (S407:YES), an error informing process is performed (S417). FIG. 13 shows details of the error informing process.

When the error informing process starts, it is determined whether there is the information about the target printer stored in the printer management tool information database (S501). That is, at S501, it is determined whether the server 1 has obtained the information of the target printer since the target printer was recognized on the network.

When the server 1 has not yet obtained the information of the target printer (S501:NO), an error icon representing the unknown connection type is outputted because the connection type of the target printer is unknown, i.e., whether it is the wired connection type or the wireless connection type (S503). In this case, the error icon, which represents the unknown connection type and a bad communication quality, is selected from the printer management tool icon database (FIG. 7) and is outputted. The error icon is eventually incorporated into the file in the web page format to be provided to the client so it can be displayed on the browser at the client side. When the file is displayed on the browser at the client side, the error icon is displayed in the leftmost column of the list as shown in FIG. 5. At S503, information, such as tags and links, to be described in the file in the web page format is outputted and the file for display is partially created (an intermediate file is created).

When the server 1 has obtained the information of the target printer at least once before (S501:YES), the connection type of the target printer is obtained from the printer management tool information database (FIG. 4) (S505). When the target printer is the wireless connection type (S507:YES), a wireless connection error icon is outputted (S509). In this case, the error icon, which represents the wireless connection type and the bad communication quality, is selected from the printer management tool icon database (FIG. 7) and is outputted. When the target printer is not the wireless connection type (S507:NO), a wired connection error icon is outputted (S511). In this case, the error icon, which represents the wired connection type and the bad communication quality, is selected from the printer management tool icon database (FIG. 7) and is outputted. These error icons are eventually incorporated into the file in the web page format to be provided to the client for display on the browser at the client side. When the file is displayed on the browser at the client side, the error icons are displayed in the leftmost column of the list as shown in FIG. 5. At S503, information, such as tags and links, to be described in the file in the web page format is outputted and the file for display is partially created (the intermediate file is created).

When S501 to S511 of FIG. 13 are finished as described above, S417 of FIG. 12 is finished. When S415 or S417 of FIG. 12 is finished, S327 of FIG. 11B is finished. Thus, the process of storing the information of the target printer into the printer management tool database is completed. The error output is also completed if the error informing process has been performed.

At S325 of FIG. 11B, when the obtained connection type does not match with the set information update flag (or when the information update flag has not been set at S307 or S313) (S325:NO), flow moves to S329. After S327, flow also moves to S329.

At S329, it is determined whether the current target printer is the last target printer stored in the printer management tool information database (FIG. 4), i.e., there is no printer to be targeted remaining therein (S329). When there is at least one printer to be targeted remaining therein (S329:NO), flow goes back to S315. As long as there are printers to be targeted therein, S315 to S329 are repeatedly performed. When all of the printers stored in the printer management tool information database are processed (S329:YES), then, flow moves to a first printer information obtaining subroutine of FIGS. 19A and 19B (S331).

Figure 19A:
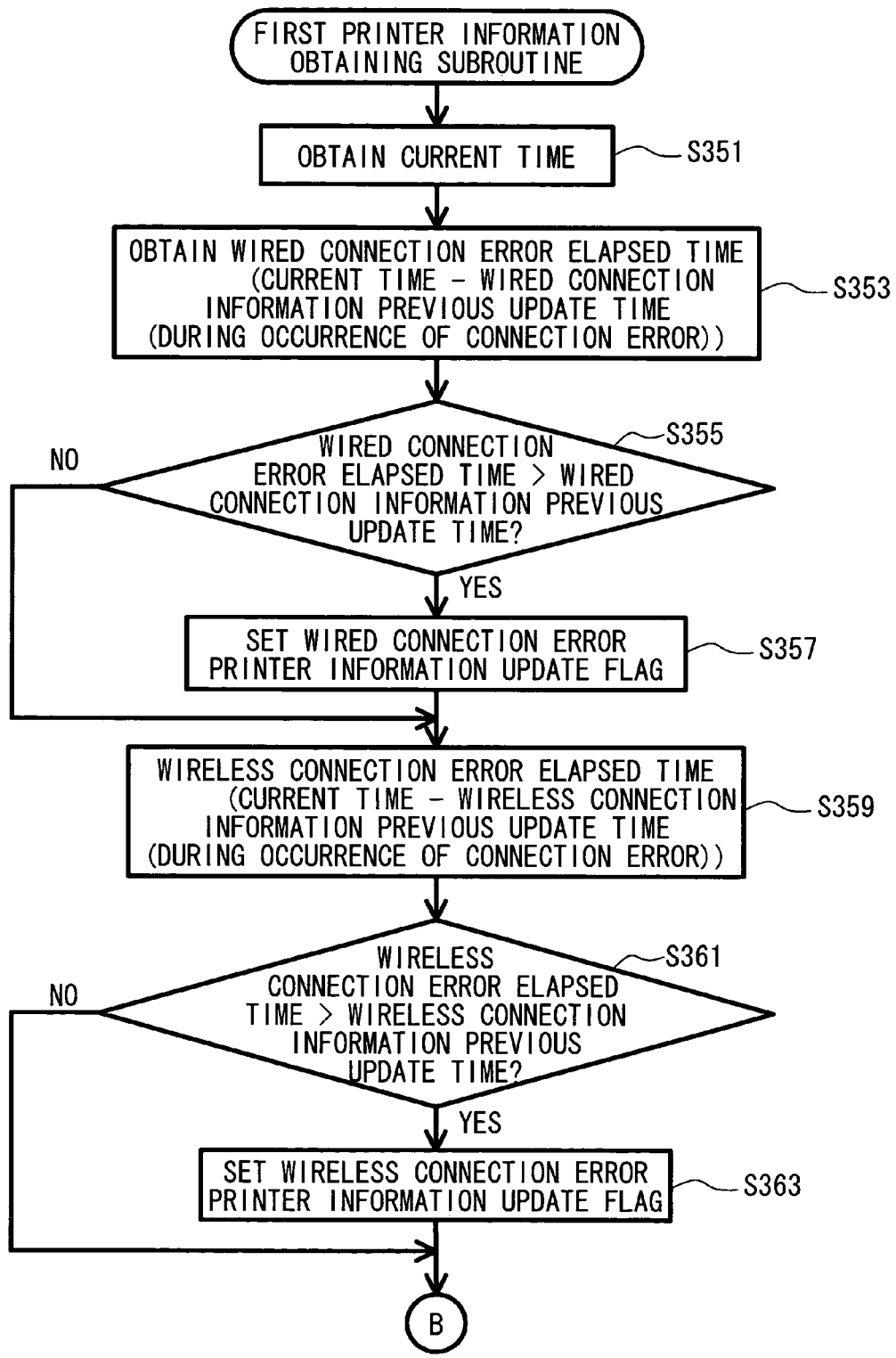
FIG. 19A is a flowchart of a first printer information obtaining subroutine.
Figure 19B:
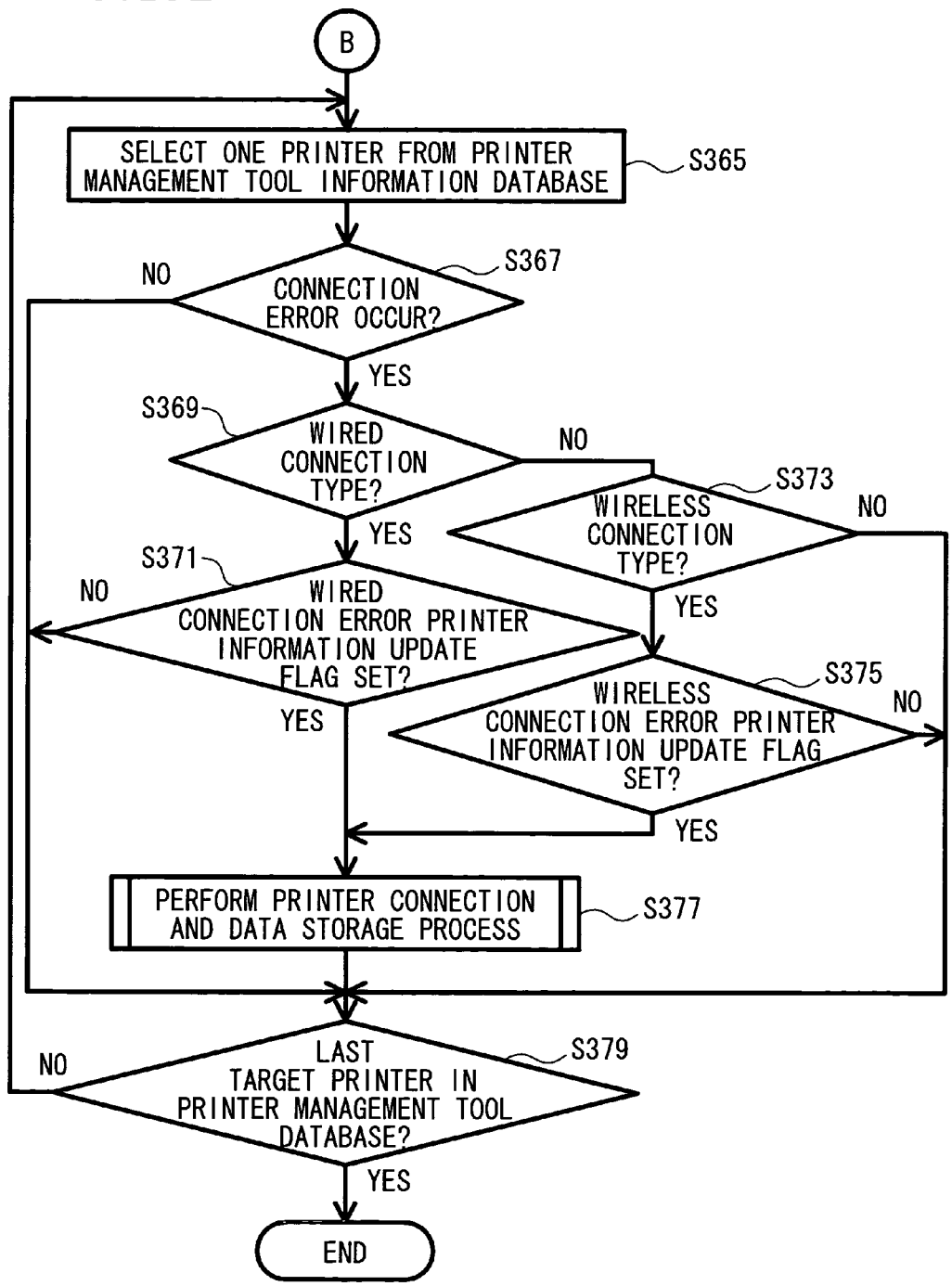
FIG. 19B is a continuation of the flowchart of the first printer information obtaining subroutine of FIG. 19A.

The first printer information obtaining subroutine is provided in order that the server 1 obtains the information of the target printer at a frequency which is higher than the other printers, when the server 1 becomes unable to communicate with the target printer. FIGS. 19A and 19B show details of the first printer information obtaining subroutine.

When the first printer information obtaining subroutine starts, a current time (S351) and a wired connection error elapsed time (S353) are obtained. The wired connection error elapsed time refers to a time that has elapsed since a previous connection error was detected (a wired connection information previous update time (during occurrence of a connection error)) in the wired printers. The wired connection error elapsed time is obtained by subtracting the wired connection information previous update time (during occurrence of connection error) from the current time (Wired connection error elapsed time=Current time−Wired connection information previous update time (during occurrence of connection error)).

When the wired connection error elapsed time exceeds the wired connection information update time (during occurrence of connection error) (S355:YES), a wired connection error printer information update flag is set (S357). In FIG. 6, the wired connection information update time (during occurrence of connection error) is indicated in the first data line of the information update time (during occurrence of connection error) column of the printer management tool control database. The update interval of the wired connection type of the exemplary embodiment is set to 300 seconds. That is, in this exemplary embodiment, the printer information is updated every 300 seconds regardless of the presence or absence of the connection error when the connection type is the wired connection. When the wired connection error elapsed time does not exceed the wired connection information update time (during occurrence of connection error) (S355:NO), flow moves to S359. The wired connection error printer information update flag is provided in the memory (the RAM 22) during the execution of this process and is to be referred to at S371 in order to determine whether S377 is to be performed.

Then, a wireless connection error elapsed time is obtained (S359). The wireless connection error elapsed time refers to a time that has elapsed since a previous connection error was detected (a wireless connection information previous update time (during occurrence of connection error)) in the wireless printers. The wireless connection error elapsed time is obtained by subtracting the wireless connection information previous update time (during occurrence of connection error) from the current time (Wireless connection error elapsed time=Current time−Wireless connection information previous update time (during occurrence of connection error)).

When the wireless connection error elapsed time exceeds the wireless connection information update time (during occurrence of connection error) (S361:YES), a wireless connection error printer information update flag is set (S363). In FIG. 6, the wireless connection information update time (during occurrence of connection error) is indicated in the second data line of the information update time (during occurrence of connection error) column of the printer management tool control database. The update interval of wireless connection type of the exemplary embodiment is set to 10 seconds. That is, for the wireless connection type, in this exemplary embodiment, the printer information is updated every 30 seconds when a connection error has not occurred (i.e., under normal conditions), and is updated every 10 seconds when a connection error has occurred. The frequency of the information update during the occurrence of the wireless connection error is three times as often as the normal condition. When the wireless connection error elapsed time does not exceed the wireless connection information update time (during occurrence of connection error) (S361:NO), flow moves to S365. The wireless connection error printer information update flag is provided in the memory (the RAM 22) during the execution of this process and is to be referred to at S375 in order to determine whether S377 is to be performed. As described above, in the wireless communication, the information obtaining timing varies depending on the presence or absence of the connection error. It is preferable the interval of the information obtainment be shortened when the connection error has occurred.

Then, one of the printers is selected from the printer management tool information database (FIG. 4) (S365). The following steps are performed in order to obtain the information of the printer selected at S365. First, it is determined whether a connection error has occurred in the connection between the server 1 and the selected printer (the target printer) (S367). When a connection error has occurred (S367:YES), flow moves to S369. When a connection error has not occurred (S367:NO), flow moves to S379.

At S369, it is determined whether the target printer is the wired connection type (S369). When the target printer is the wired connection type (S369:YES), then, it is determined whether the wired connection printer information update flag has been set (S371). The information update flag has been set if S357 was performed. When the update flag has been set (S371:YES), flow moves to S377. When the information update flag has not been set (S371:NO), flow moves to S379.

At S369, when the target printer is not the wired connection type (S369:NO), it is determined whether the target printer is the wireless connection type (S373). When the target printer is the wireless connection type (S373:YES), it is further determined whether the wireless connection error printer information update flag has been set (S375). The information update flag has been set if S363 was performed. When the information update flag has been set (S375:YES), flow moves to S377. When the update flag has not been set (S375:YES), flow moves to S379. When the target printer is not the wireless connection type (S373:NO), flow also moves to S379.

Through S367 to S375, flow moves to either S377 or S379. When flow moves to S377, the printer connection and information storage process is performed (S377). The contents of S377 are similar to those of S327 of FIG. 11B, so that an explanation for S377 will be omitted. After S377, flow moves to S379.

At S379, it is determined whether the current target printer is the last target printer stored in the printer management tool information database, i.e., there is no printer to be targeted remaining therein (S379). When there is at least one printer to be targeted therein (S379:NO), flow goes back to S365. As long as there are printers to be targeted therein, S365 to S379 are repeatedly performed. When all of the printers stored in the printer management tool information database are processed (S379:YES), the first printer information obtaining subroutine of FIGS. 19A and 19B is completed.

When S351 to S379 are finished, S331 of FIG. 11B is completed. Then, flow moves to a second printer information obtaining subroutine (S333).

Figure 20:
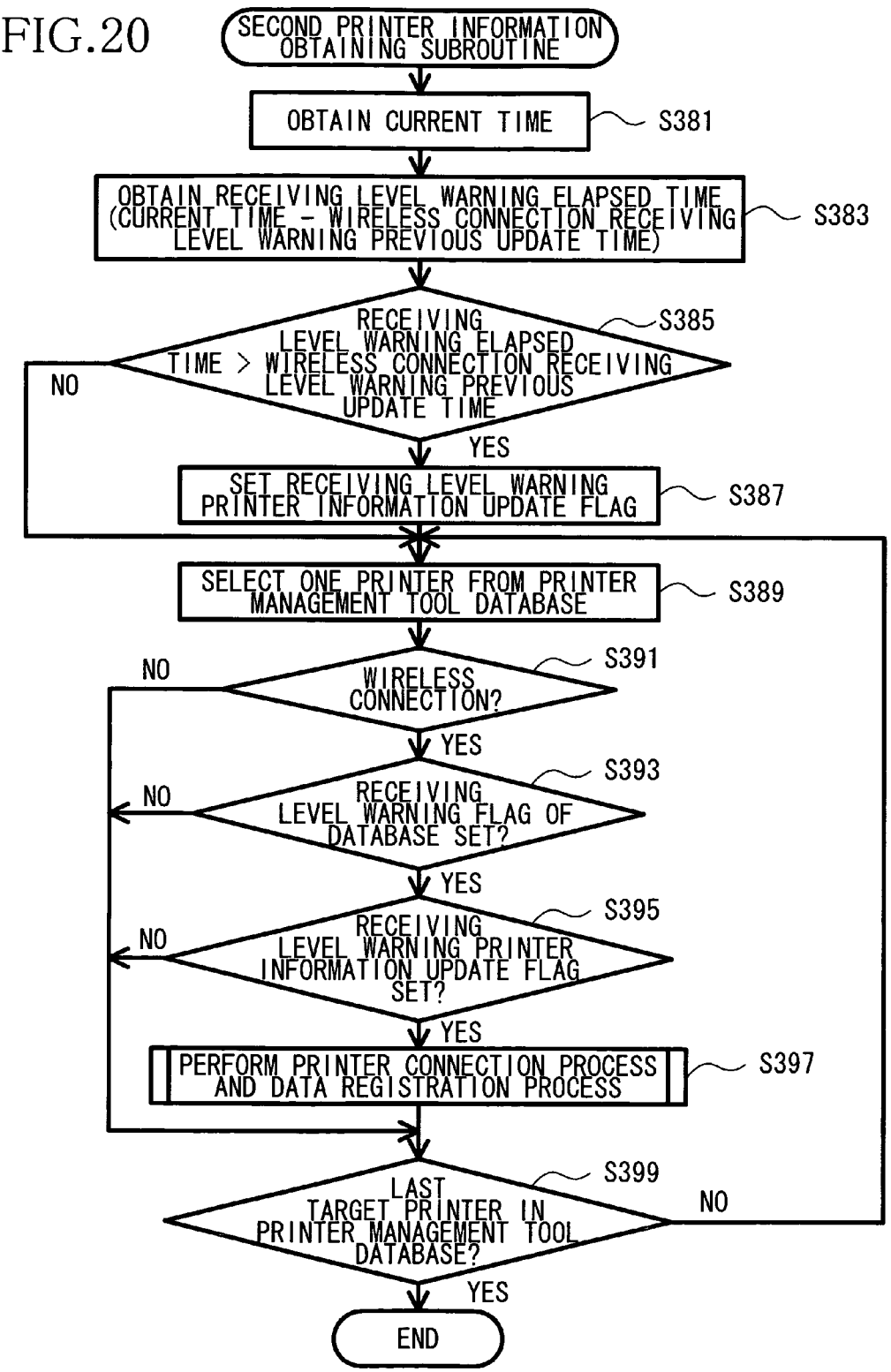
FIG. 20 is a flowchart of a second printer information obtaining subroutine.

The second printer information obtaining subroutine is provided in order to execute a process of obtaining the information of the target printer at a frequency higher than the other printers when the server 1 received a warning of a reduction in receiving level (the radio field strength) at the printer side, from the target printer. FIG. 20 shows details of the second printer information obtaining subroutine.

When the second printer information obtaining subroutine starts, a current time (S381) and a receiving level warning elapsed time (S383) are obtained. The receiving level warning elapsed time refers to a time that has elapsed since a warning of the reduction in the receiving level (the radio field strength) of the wireless printer was received (a wireless connection information previous update time (during warning of receiving level)). The receiving level warning elapsed time is obtained by subtracting a wireless connection information previous update time (during warning of receiving level) from the current time (Receiving level warning elapsed time=Current time−Wireless connection information previous update time (during warning of receiving level)).

When the receiving level warning elapsed time exceeds the information update time (during warning of receiving level) (S385:YES), a printer information update flag (during warning of receiving level) is set (S387). In FIG. 6, the information update time (during warning of receiving level) is indicated in the second data line of the information update time (during warning of receiving level) column of the printer management tool control database. The information update time (during warning of receiving level) is set to 10 seconds. That is, in this exemplary embodiment, the printer information is updated every 30 seconds when the warning is not being issued, and is updated every 10 seconds when the warning is being issued, in the wireless connection. The frequency of the information update of the wireless printers while the warning is being issued is three times as often as that while the warning is not being issued. When the wireless connection receiving level warning elapsed time does not exceed the information update time (during warning of receiving level) (S385:NO), flow moves to S389. The printer information update flag (during warning of receiving level) is provided in the memory (the RAM 22) during the execution of this process, and is referred to at S395 to determine whether S397 is to be performed. As described above, the different intervals of obtaining the printer information are set to the state where the warning is being issued and the state where the warning is being not issued. More preferably, the interval of obtaining the printer information of the wireless printer while the warning is being issued is set to be shorter than the state where the warning is not being issued.

Then, one of the printers is selected from the printer management tool information database (FIG. 4) (S389). The following steps are performed in order to obtain the information of the printer selected at S389. First, it is determined whether the selected printer (the target printer) is the wireless connection type (S391). When the target printer is the wireless connection type (S391:YES), flow moves to S393. When the target printer is not the wireless connection type (S391:NO), flow moves to S399.

At S393, it is determined whether the receiving level warning flag has been set in the printer management tool information database. The receiving level warning flag is set (or turned on) when an SNMP manager process, which is a resident process, receives an SNMP trap from the target printer and the received printer information includes receiving level warning information. The process of transmitting the receiving level warning information to be performed by the printer will be described later.

At S393, when the receiving level warning flag of the database has been set (S393:YES), the receiving sensitivity of the target printer is lowered. In this case, flow moves to S395. When the receiving level warning flag of the database has not been set (S395:NO), flow moves to S399.

At S395, it is determined whether the printer information update flag (during warning of receiving level) has been set. The printer information update flag has been set if S387 was performed. When the printer information update flag has been set (S395:YES), flow moves to S397. When the printer information update flag has not been set (S395:NO), flow moves to S399.

Through S391 to S395, flow moves to either S397 or S399. When flow moves to S397, the printer connection and information storage process is performed (S397). The contents of S397 are similar to those of S327 of FIG. 11B, so that an explanation for S397 will be omitted.

Flow moves to S397 only when at least the receiving level warning flag has been set in the printer management tool information database (FIG. 4), i.e., when the receiving sensitivity of the target printer is lowered (S393:YES), and also when the printer information update flag (during warning of receiving level) has been set (S395:YES). In this case, the information stored in the printer management tool information database (FIG. 4) is updated every 10 seconds. After S397, flow moves to S399.

At S399, it is determined whether the current target printer is the last target printer stored in the printer management tool information database (FIG. 4), i.e., there is no printer to be targeted remaining therein (S399). When there is at least one printer to be targeted remaining therein (S399:NO), flow goes back to S389. As long as there are printers to be targeted therein, S389 to S399 are repeatedly performed. When all of the printers stored in the printer management tool information database are processed (S399:YES), the second printer information obtaining subroutine of FIG. 20 is finished.

Figure 14:
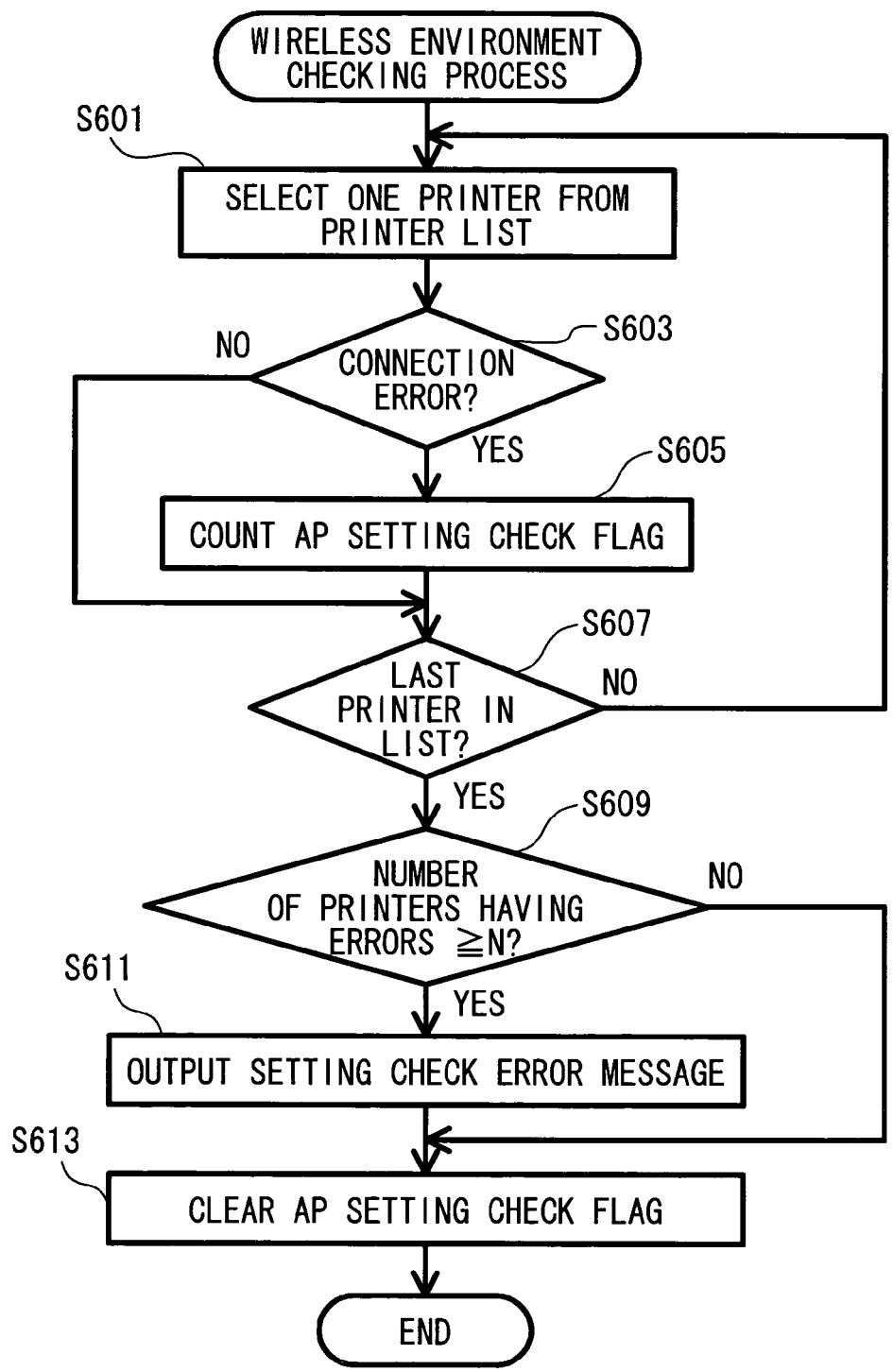
FIG. 14 is a flowchart of a wireless environment checking process.

When S381 to S399 of FIG. 20 are finished, S333 of FIG. 11B is completed. Thus, S301 to S333 of FIGS. 11A and 11B are finished at this point. As a result, S103 of FIG. 9 is completed. After that, the server 1 performs a wireless environment checking process (S105) of FIG. 9. FIG. 14 shows details of the wireless environment checking process.

When the wireless environment checking process starts, one of the printers is selected from the printer list in which the printers are listed by access point (AP) (S601). FIG. 15 shows an example of the printer list, which includes SSIDs and printer node names in correspondence with each other. When there are a plurality of access points in the network, a plurality of different SSIDs are listed therein. When a plurality of printers establish wireless connection with the same access point, a plurality of different printer node names are listed therein for one (the same) access point. The wireless environment checking process of FIG. 14 is performed in order to check the presence or absence of a connection error with respect to each printer having the same SSID. Therefore, when a plurality of different SSIDs are listed therein, the wireless environment checking process is performed on an SSID basis.

After one of the printers is selected from the printer list at S601, it is determined whether a connection error has occurred in the connection between the server 1 and the selected printer (the target printer) (S603). When the connection error has occurred (S603:YES), an AP setting check flag is counted (is incremented by one (1)) (S605), and then, flow moves to S607. When the connection error has not occurred (S603:NO), flow moves to S607. The AP setting check flag is provided in the memory (the RAM 22) during the execution of this process, and is to be referred to at S609 in order to determine whether S611 is to be performed.

At S607, it is determined whether the current target printer is the last target printer stored in the printer list, i.e., there is no printer to be targeted remaining therein. When there is at least one printer to be targeted therein, i.e., there is a printer that has the same SSID and that the presence or absence of a connection error in the connection between the server 1 and the printer has not been checked (S607:NO), flow goes back to S601. As long as there are printers to be targeted therein, S601 to S607 are repeatedly performed.

As described above, when all of the printers are processed (S607:YES), it is determined whether the number of printers having errors is greater than or equal to an error recognition criteria N (S609). The number of printers having errors refers to a value indicated by the AP setting check flag counted at S605. The error recognition criteria N is arbitrarily set by the user. In this exemplary embodiment, the error recognition criteria N is set to a value equal to the total number of printers having the same SSID.

When the number of printers having errors is greater than or equal to the error recognition criteria N (S609:YES), in this exemplary embodiment, it is determined that the number of printers having errors matches with the total number of printers having the same SSID. Thus, an error message to check the settings, for example, "All printers connected to the same access point cannot establish connection. Please check the settings.", is outputted (S611) and then flow moves to S613. When the number of printers having errors is lower than the error recognition criteria N (S609:NO), flow moves to S613. That is, in this exemplary embodiment, only when all the printers connected to the same access point cannot establish connection therebetween, the error message to check the settings is outputted.

The error message is finally incorporated into the file in the web page format, which is to be distributed to the client and is to be displayed by the browser at the client side. The error message is displayed with the display image of FIG. 5. However, at S611, information, such as tags and links, to be described in the file in the web page format for distribution, is outputted and a part of the distribution file (an intermediate file) is created.

The error recognition criteria N may not be equal to the total number of printers having the same SSID. Any value which is desired to be set as a criterion of the error recognition, for example, 80% (or 50%) of the total number of printers having the same SSID, can be set. In this case, however, the contents of the setting error message needs to be changed to, for example, "80 percent of the total number of printers connected to the same access point cannot establish connection. Please check the settings." As described above, by checking the conditions of the printers connected to the same access point, it is determined whether the access point has a problem. Then, the AP setting check flag is cleared (S613) and this process is finished.

When S601 to S613 of FIG. 14 are finished, S105 of FIG. 9 is completed. Then, the server 1 displays the printer information, performs a printing operation or outputs the created file (S107). At S107, based on the information stored in the printer management tool information database (FIG. 4), the file in the web page format that can be displayed, as a table type display image shown in FIG. 5 when the file is displayed by the browser, is outputted.

When the file is outputted, the presence or absence of the error icon image outputted at S503, S509, and S511 and the error message to check the settings outputted at S611 is determined. When the error icon image and/or the error message were outputted, the outputted error icon image and/or the outputted error message are included in the file in the web page format created at S107. When there is no error icon image outputted at S503, S509 and S511, an icon representing the good communication quality is selected from the printer management tool icon database (FIG. 7), according to the connection type (the wired connection/the wireless connection/unknown) of each printer. The file in the web page format is created so that the icon is displayed at the same position where the error icon is to be displayed (at the leftmost column of the display image of FIG. 5 when the file is displayed on the browser at the client side).

The user can arbitrarily set, in advance, which process of the displaying of the printer information, the performing of the printing operation, and the outputting of the file is to be performed. In all the cases, the file is to be outputted. When the displaying of the printer information is set, the outputted file in the web page format is provided to the browser equipped in the server 1 and is displayed on the display portion 25 of the server 1 by the display function of the browser. When the printing operation is set, the outputted file in the web page format is provided to the print program and is printed. Further, the user can view the outputted file in the web page format by the browser of the PC 2, and further can provide instructions to the PC 2 to print the file.

When S107 is finished, flow goes back to S101. Thus, the server 1 repeatedly performs S101 to S107. The server 1 detects printers existing on the network by broadcasting at S203 at substantially regular intervals. When the server 1 detects a new printer, the new printer is registered in the printer management tool information database. At S107, the latest information at that point is outputted by a file in the web page format at substantially regular intervals. By using the web server function of the server 1, the outputted file in the web page format can be displayed on the browser of the PC 2.

In the above description, the processes to be executed by the server 1 have been described. Concurrently with those processes, a printer information update process, a printer information providing process and a receiving level warning information transmitting process are executed in each multifunctional machine 11 to 14, 16 to 19. These processes will be described with reference to FIGS. 16 to 18 by taking the multifunctional machine 11 as an example.

The printer information update process is repeatedly performed in the multifunctional machine 11 in order to provide its printer information to the server 1 when the server 1 requests the multifunctional machine 11 to provide the printer information.

When printer information update process starts, it is determined whether any changes have been made to its structure (S701). In this embodiment, when a change has been made to the items which can be arbitrarily changed by the user (e.g., the printer node name and the IP address for any connection type, and the connection type and the SSID for wireless connection), it is determined that the change has been made to the structure (S701:YES), and the printer information is obtained (S703). When no change has been made to the structure (S701:NO), flow moves to S705.

Then, it is determined whether an information update time (S705) has passed. Any time period can be set as the information update time (e.g. 10 seconds). When the information update time (S705:YES) has passed, the wireless connection information is then obtained (S707). The wireless connection information (e.g., the radio field strength, the communication quality) is changeable at any time. The information obtained at S703 and/or S707 is stored in the printer information database (FIG. 3A) (S709), and thus, the series of processing is finished.

Figure 17:
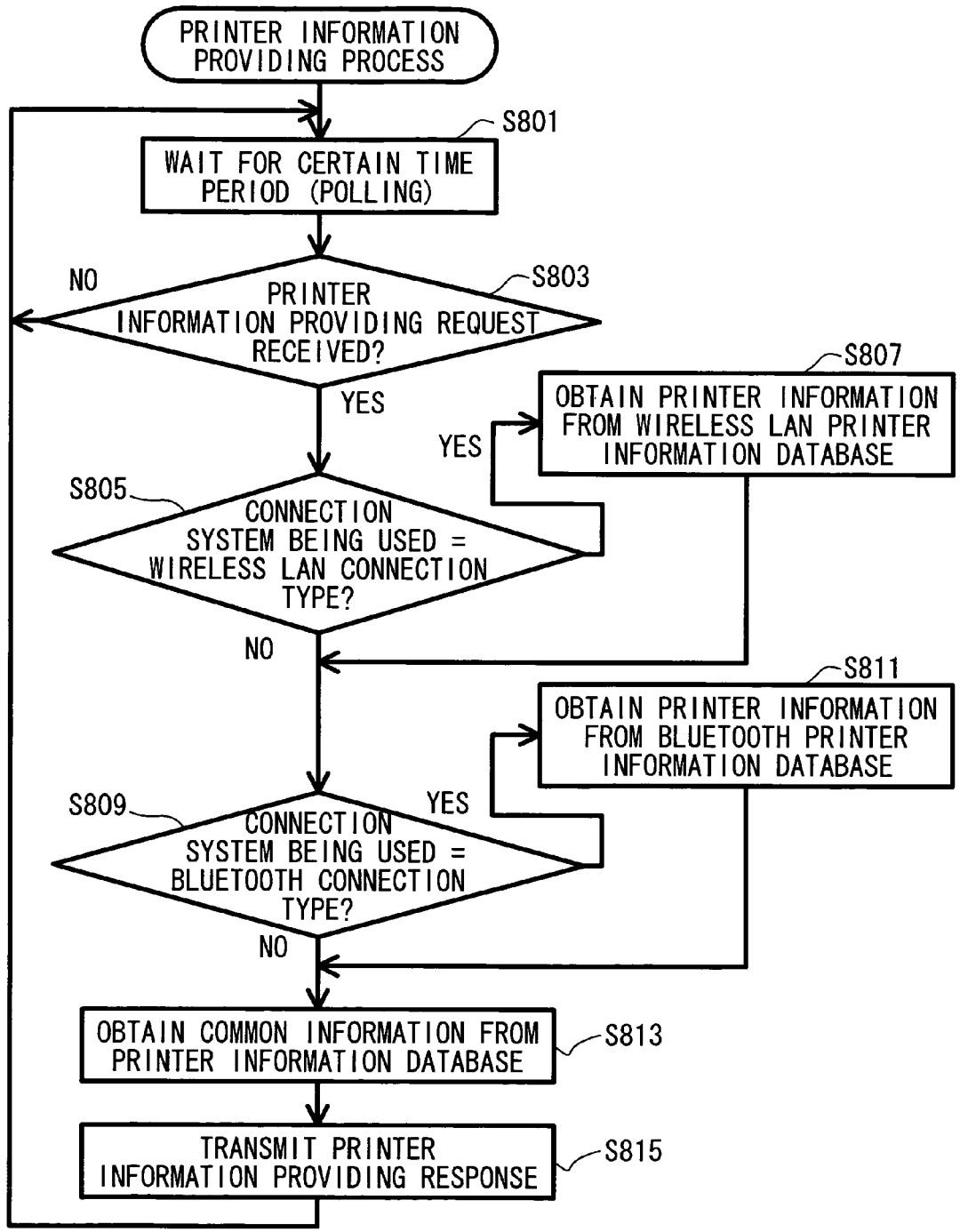
FIG. 17 is a flowchart of a printer information providing process.

The information stored into the printer information database by the above process is provided to the server 1 by a printer information providing process shown in FIG. 17. The multifunctional machine 11 also repeatedly performs this process.

When the printer information providing process starts, flow waits for a certain time period (polling) (S801). When the multifunctional machine 11 has not received a printer information providing request from the server 1 (S803:NO), S801 and S803 are repeatedly performed.

The printer information providing request is transmitted from the server 1 to the multifunctional machine 11 via the SNMP at S413 of FIG. 12. When the multifunctional machine 11 has received a printer information providing request from the server 1 (S803:YES), it is determined whether the connection system being used for the network connection is the wireless LAN based on the IEEE802.11 family standard (S805). When the connection system being used is the wireless LAN connection type (S805:YES), the requested information related to the wireless LAN connection is obtained from the wireless LAN printer information database (FIG. 3B) (S807) and then flow moves to S809. Also, when the connection system being used is not the wireless LAN connection type (S805:NO), flow moves to S809.

When the connection system being used is the Bluetooth connection type (S809:YES), the requested information related to the Bluetooth connection is obtained from the Bluetooth printer information database (FIG. 3B) (S811) and flow moves to S813. Further, when the connection system being used is not the Bluetooth connection type (S809:NO), flow moves to S813.

The common information for the wireless and wired connections is obtained from the printer information database (FIG. 3) (S813). Thus, the printer information includes at least one of the common information obtained at S813 and the information obtained at S807 or S811. A printer information providing response, which includes the printer information, is then transmitted to the server 1 (S815). The printer information providing response refers to a reply to the request made by the server 1 via the SNMP and includes the printer information requested by the server 1. After S815, flow goes back to S801. Thus, S801 to S815 are repeatedly performed substantially at regular intervals.

Figure 18:
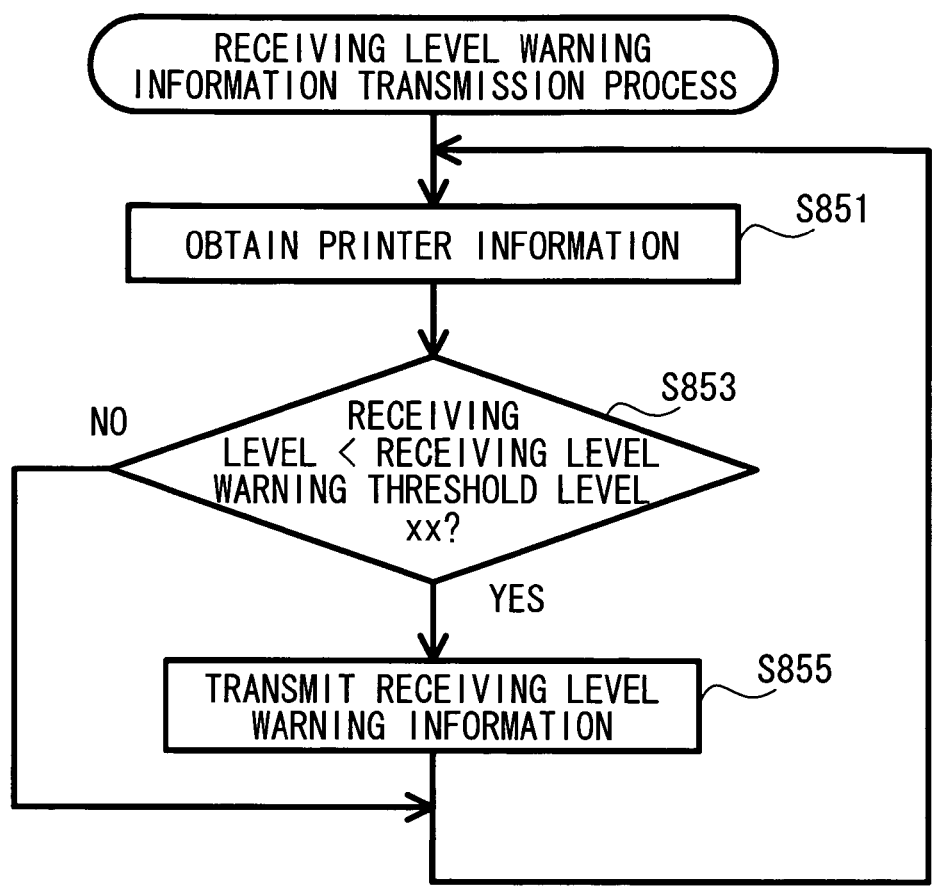
FIG. 18 is a flowchart of a receiving level warning information transmission process.

In addition, the multifunctional machine 11 performs a receiving level warning information transmitting process shown in FIG. 18. The multifunctional machine 11 also repeatedly performs this process.

When the receiving level warning information transmitting process starts, the printer information is obtained (S851). Because the multifunctional machine 11 uses the wireless LAN based on the IEEE802.11 family standard, the printer information is obtained from the wireless LAN printer information database (FIG. 3B) equipped therein. When the connection system being used for the network connection is the Bluetooth standard (for example, in the case of the multifunctional machine 14), the printer information is obtained from the Bluetooth printer information database (FIG. 3C) equipped therein. In both cases, the obtained printer information includes a current radio field strength and a threshold level (FIGS. 3B and 3C).

Then, it is determined whether a receiving level (the radio field strength included in the obtained printer information) is lower than a receiving level warning threshold xx (the threshold level included in the obtained printer information) (S853). When the receiving level is lower than the receiving level warning threshold level xx (S853:YES), receiving level warning information is transmitted (S855). The receiving level warning information is transmitted to the server 1 (the printer management tool) by using a trap process in the SNMP.

By the SNMP manager process as the resident-process, the server 1 receives the SNMP trap. Then, a receiving level warning flag (FIG. 4) in the printer management tool information database is turned on (set to one (1)). As described above, the server 1 (the printer management tool) accepts the warning of the receiving level, provided from the printer, at all times. When the receiving level is greater than or equal to the receiving level warning threshold level xx at the time of obtaining the printer information at S413 by the server 1, the receiving level warning flag is turned off (set to zero (0)) at S415. When S855 is finished or when the receiving level is greater than or equal to the receiving level warning threshold xx at S853 (S853:NO), the series of this processing is finished.

Figure 16:
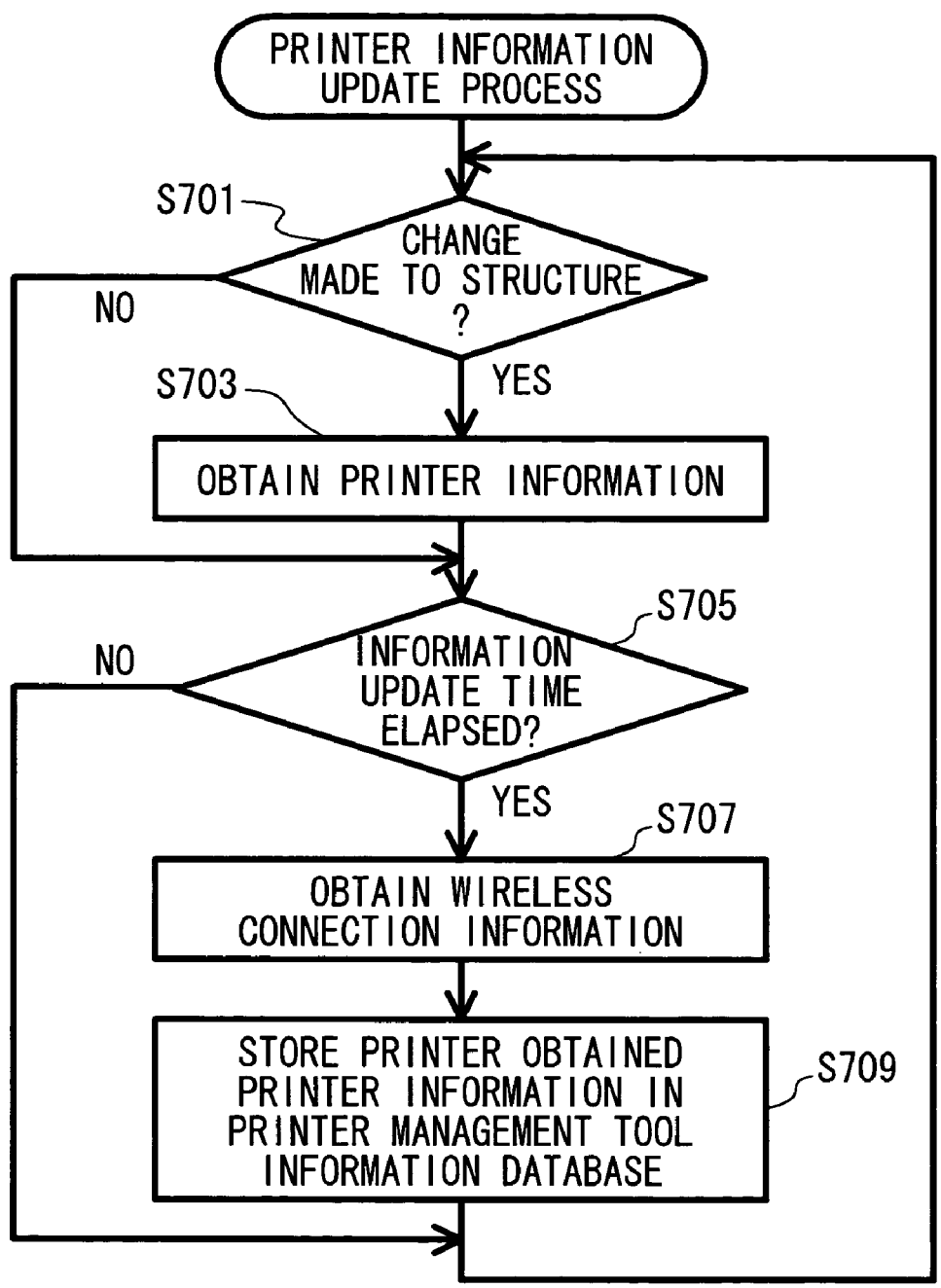
FIG. 16 is a flowchart of a printer information update process.

All the processes of FIGS. 16 to 18 performed in the multifunctional machine 11 described above are also performed in the multifunctional machines 12 to 14 wirelessly connected to the network. In the multifunctional machines 16 to 19 connected to the network by the LAN cable, the processes of FIGS. 16 and 17 are also performed except S707 of FIG. 16.

As described above, in the network device management system, each multifunctional machine 11 to 14, 16 to 19 stores its own printer information in its own printer information database and prepares for the request from the server 1 so as to be able to provide the printer information at anytime when the server 1 needs the information. Then, the server 1 obtains the printer information from the multifunctional machines 11 to 14, 16 to 19 and outputs the information by the file in the web page format which can be displayed by the server 1 browser or the browser of the PC 2. In the display image of the file displayed by the browser, as shown in FIG. 5, the connection types of the multifunctional machines 11 to 14, 16 to 19, i.e., the wireless connection or the wired connection, are identified in the list.

Accordingly, the user who sees the connection type information can identify the network connection types of the multifunctional machines 11 to 14, 16 to 19 as to whether it is the wired connection or the wireless connection. In addition, the user can determine, at a glance, a proportion between the wireless connection and the wired connection being used in the network.

In the network device management system, the printer information is updated every 30 seconds for the wireless connection, and is updated every 300 seconds for the wired connection. When the connection type is the wireless connection, the printer information is obtained and updated at frequency higher than the wired connection. As compared with a case where the printer information is obtained and updated at the same frequency for the wireless connection and for the wired connection, the frequency of obtaining and updating the printer information for the wireless multifunctional machines 11 to 14 can be increased even when the amount of the load on the network is the same between the wireless connection and wired connection.

Therefore, the condition changes occurring in the wireless multifunctional machines 11 to 14 can be immediately provided to the user. More specifically, the wireless connection environment is likely to be affected by the surrounding radio field environment, for example, an addition/approach of other wireless device to the network environment or the operation of a microwave. Accordingly, as the frequency of updating the information is higher, the changes of the radio wave environment can be instantaneously obtained, so that appropriate measures can be taken to the condition changes. In addition, in the exemplary embodiment, the retry is performed in order to establish the connection for the wireless connection, so that an error can be recovered by the retry even when the error has occurred due to the fleeting changes of the radio wave environment. For the wired multifunctional machines 16 to 19, the frequency of obtaining the printer information is relatively low. However, in the wired connection, the condition changes happen less as compared with the wireless connection. Accordingly, no practical problem happens in this system.

In the network device management system, when a wireless printer is newly connected to the network, the printer information of the newly-connected wireless printer is updated every 10 seconds which is a frequency higher than the other printers (whose printer information is updated every 30 seconds). Therefore, the printer information of the newly-connected wireless printer, which has not been in operation for enough time since the printer was connected to the network and which is not determined whether there is a problem in the connecting condition, can be immediately provided to the user almost in real time.

For the wireless printer, its communication quality may be changed when the installed location of the printer is changed. Therefore, by the promptly obtaining and updating the information, the printer information is provided to the user after the result of adjusting the installed location of the printer is immediately reflected in the information. Thus, the appropriate installed location of the newly-connected printer can be easily found and adjusted.

In the network device management system, as shown in FIGS. 5 and 7, the wireless connection error icon or the wired connection error icon can be displayed as the error information in order to inform the user of the occurrence of an error in the communications between the multifunctional machine 11 to 14, 16 to 19 and the server 1. Accordingly, the user can identify the connection type of the multifunctional machine 11 to 14 having an error (the wireless connection or the wired connection) by looking at the icon.

As shown in FIG. 5, as to the wireless printers (the multifunctional machines 11 to 14), the SSIDs of the access points are displayed as the access point information corresponding to the respective wireless printers, so that the user can easily determine which printers are connected to which access points.

When the communications become unable to be performed between the server 1 and the plurality of printers which are connected to the same access point through S601 to S611, a file including the information to the effect that the access point may have a problem is outputted, so that the user can be informed of the problem at the access point. In this exemplary embodiment, only when the server 1 cannot perform communications with all the printers connected to the same access point, the file including the above information is outputted. For example, when some printers have problems but other printers have no problem, the problem information is not outputted. Therefore, more definitive information can be provided to the user.

In the network device management system, the printer information can be outputted in different ways in accordance with the connection types. Accordingly, the user can easily identify the connection types of the printers connected to the network.

The different icons can be outputted in accordance with the connection types. Accordingly, the user can easily identify the connection types of the printers connected to the network, by looking at the outputted icons.

The server 1 includes the printer management tool information database in which the obtained printer information is stored. When the server 1 is unable to obtain the printer information from the target printer, the network connection type of the target printer is read from the printer management tool information database. Then, the information indicating that the connection between the target printer and the network is not established is outputted in a format such that the user can identify the connection type of the target printer.

With this structure, when the network device which has established the connection with the network becomes unable to perform communications with the network, the information indicating this condition can be provided to the user. Therefore, the user can be informed of the current connecting condition of the target printer connected to the network.

When the target printer is the wireless connection type, the printer information of the target printer is updated at the frequency higher than the wired printers. More specifically, in order to provide the user with the printer information almost in real time, it is conceivable that it is better to increase the frequency of obtaining the printer information. In the wireless printers, the communication condition is likely to change due to external factors, such as changes in the operating conditions of the wireless network devices existing around the wireless printers and the change in conditions of factors that interfere with the wireless communications. Accordingly, it is preferable to provide the user with the condition change information in real time or near real time, when possible.

However, in view of the load on the network and the time required to update the printer information of all of the printers, it is desirable not to increase the frequency of obtaining the printer information of all of the printers.

In the network device management system of the exemplary embodiment, however, only when the printer is the wireless connection type, the printer information of the target printer is obtained at the frequency higher than the wired printers. Accordingly, as compared with a case where the printer information is obtained and updated at the same frequency for the wireless connection and for the wired connection, the frequency of obtaining and updating the printer information for the wireless printers can be increased even when the amount of the load on the network is the same between the wireless connection and wired connection.

Therefore, the condition changes occurring in the wireless printers can be immediately made available to the user. For the wired printers, the frequency of obtaining the printer information is lower than the case where the printer information is obtained at the same frequency for both the wired and wireless connections. However, in the wired connection, the condition changes happen less compared with the wireless connection. Accordingly, no practical problem happens in this system.

When the server 1 becomes unable to communicate with the target printer, the server 1 obtains the information of the target printer at the frequency which is higher than the other printers. By doing so, when the wireless communications cannot be performed due to external factors, such as the changing of the operating conditions of wireless network devices existing around the wireless printers and the changing of conditions of factors that interfere with the wireless communications, the server 1 obtains the information of the target printer at the frequency higher than that of the other printers. Therefore, when the wireless communication are again possible, the information concerning the condition changes are immediately available to the user.

As part of the printer information, the receiving level warning information, which indicates that the receiving level is lower than the predetermined threshold level in the wireless communication, can be provided, and when the receiving level warning information is transmitted by the printer, the server 1 obtains the printer information from the target printer at the frequency higher than the condition where the receiving level warning information is not transmitted by the printer.

By doing so, when the receiving level warning information is transmitted from the target printer due to the reduction in the receiving level in the wireless communications at the target printer, the server 1 obtains the printer information from the target printer at the frequency higher than the case where the printer information is not transmitted. Accordingly, the information of such conditions is immediately available to the user when the communication conditions become unstable.

Further, when a printer is newly connected to the network, the server 1 obtains printer information of the newly-connected printer at the frequency higher than the other existing printers. In this structure, the target printer is regarded as a newly-connected printer until a predetermined time is elapsed from a reference time, which is the time at which the target printer is connected to the network and the time at which the connection of the target printer to the network is detected. The reference time can be set as necessary by the system, more preferably, it can be set by the user to a desired setting.

By doing so, when the new printer is connected to the network, the server 1 obtains the printer information of the newly-connected printer at the frequency higher than that of other existing printers. Therefore, the printer information of the newly-connected printer, which has not been in operation for enough time since the printer was connected to the network and which is not determined whether there is a problem in the connecting condition, can be immediately provided to the user. Particularly, when equipment is installed in the wireless network, the radio wave condition of the location where the wireless equipment is to be installed cannot be determined whether it is in the good or bad condition unless the wireless equipment is operated at the location. Accordingly, immediately providing the conditions is of benefit to the user.

When the error information which indicates that the target printer has an error is outputted, the error information is outputted in the manner so that it can be determined the error information is related to the wired printer or the wireless printer. By doing so, when the error information is outputted, the user can easily identify the connection type of the target printer.

In the wireless printer, as part of the printer information, the access point information corresponding to the printer can be provided. Based on the access point information, the access point information corresponding to the printer is outputted.

The access point corresponding to the printer refers to an access point that establishes a wireless connection with the printer. The access point information refers to unique information (e.g., a node of the access point, an SSID for the wireless LAN based on the IEEE802.11 family standard (e.g., IEEE802.11a, IEEE802.11b, IEEE802.11g)) assigned a specific access point only even when there is a plurality of access points. The access point information refers to the information that specifies only one access point corresponding to the unique information. By doing so, the user can easily identify the access point through which the printer is connected to the network.

Further, when a plurality of the printers connected to the access point cannot communicate with the server 1, the information that indicates the probability of the existence of a problem at the access point can be provided to the user.

When a plurality of the printers connected to the access point cannot communicate with the server 1, it is suspected that the problem likely arises at the access point as compared with the case where problems arise at the plurality of the printers at the same time. By doing so, the occurrence of some problem at the access point can be provided to the user.

However, there may be still a probability that some problem arises at the plurality of printers at the same time. Accordingly, in order to inform the user of further reliable problem information, it is preferable that the error message be outputted when the server 1 becomes unable to communicate with all of the plurality of printers.

By doing so, only when the server 1 becomes unable communicate with all the printers connected to the same access point, the problem information is outputted. For example, when some printers have problems but the other printers have no problem, the problem information is not outputted. Therefore, more definitive information can be provided to the user. Further, the problem information that indicates the probability of the presence of the problem at the access point may indicate that the probability of the presence of the problem at the installed location of the access point.

When communication cannot be performed between the access point and the plurality of printers, the cause of the problem arising at the access point may be, in most cases, the inappropriate provision of the installed location of the access point, for example, the access point is located next to an object which generates low frequency radio waves.

The information to be provided to the user can be outputted in any format. The server 1, which includes the CPU 20 that obtains the printer information from the target printer and outputs the obtained printer information, and the PC 2, which includes the browser on which the data file in the web page format is displayed, are connected to the network. The server 1 outputs a part or all of the printer information by the data file in the web page format, in response to a request made by the PC 2.

With this structure, the PC 2 can display the data file in the web page format using the browser, so that a plurality of computers on the network need not be provided with the function of obtaining the printer information.

The connection type of the printer can be provided to the server 1 by any communication procedure. However, it is preferable to use the SNMP. By doing so, it is not necessary to develop a special protocol in order to provide the connection type. The connection type information can be provided by the SNMP, which is tried and true in a plurality of network devices.

The connection type information may be any kind of information that can distinguish the connection type, the wired connection or the wireless connection. However, the connection type information is the connection setting information to be used in order to establish a connection between the printer and the wireless network.

The connection setting information to be used in order to establish the connection between the printer and the wireless network, refers to information needed to connect the printer to the wireless network and includes, for example, ID information and a network name (e.g., the SSID for the wireless LAN based on the IEEE802.11 family standard) to be used in order to identify the wireless network to be connected, a communication channel to be used in the wireless communication, an encryption key (a wireless encryption privacy for the wireless LAN based on the IEEE802.11 family standard) to be used to encrypt data, and a network address). The connection setting information is not used in the wired connection or is information which is to be used but whose contents are to be changed.

By doing so, it is unnecessary to provide the connection setting information only for use as the connection type information. By providing the connection setting information for use by the printer in order to connect to the wireless network, the connection setting information is then also used as the connection type information, so that the determination whether it is a wireless connection or a wired connection can be made. When the printer is designed so as to connect to the network via the access point, the connection setting information is the information used to establish the connection between the printer and the access point.

A network management program may be provided to the user by a computer-readable recording medium, such as a magnetic recording medium (e.g. a flexible disk) or an optically readable recording medium (e.g., a CD-ROM, DVD-ROM), or via a network (e.g. the Internet) which can transmit the program.

While the invention has been described in detail with reference to an exemplary embodiment thereof, it would be apparent to those skilled in the art that various changes, arrangements and modifications may be applied therein without departing from the spirit and scope of the invention.

For example, at S611, the error message to check the settings such that "All printers connected to the same access point cannot establish connection. Please check the settings." is outputted. When all the printers connected to the same access point cannot establish the connection, there is a problem, in most cases, in the installed location of the access point. Accordingly, the outputted error message to check the settings may be, for example, "All printers connected to the same access point cannot establish connection. Please check the installed location of the access point." The error message may be sent by an e-mail to an administrator's e-mail address set in advance in the printer management tool.

In the above-described exemplary embodiment, the same information is obtained from the printer management tool regardless of the wireless or wired printers. However, first, the connection type information, i.e., whether the printer is the wireless connection type or the wired connection type may be obtained, and then, specific information of the wireless printer or the wired printer may be obtained.

In the above-described exemplary embodiment, the radio field strength is stored in the respective wireless LAN printer information databases in the multifunctional machines 11 to 14 after the numeric value of the radio field strength is converted into category information such as "extremely weak", "weak", "moderate", or "strong". Further, the server 1 also uses the converted radio field strength information provided from the multifunctional machines 11 to 14, just as they are. However, such a conversion may be performed in the server 1. In the multifunctional machines 11 to 14, the numeric values of the radio field strength may be stored in the respective wireless LAN printer information database. Then, the multifunctional machines 11 to 14 provide the information of the numeric values to the server 1, and the server 1 may convert the obtained numeric values into the category information such as "extremely weak", "weak", "moderate", or "strong".

In the above-exemplary embodiment, the file in the web page format created at S107 of FIG. 9 includes and outputs the radio field strengths in text form (FIG. 5). However, the radio field strengths may be outputted by icons shown in FIG. 21.

In the above-exemplary embodiment, the file in the web page format (FIG. 5) includes the current radio field strength about the printer whose communication quality is bad. Thus, the user can understand that the bad communication quality is caused by factors other than the radio field, strength.

Figure 22:
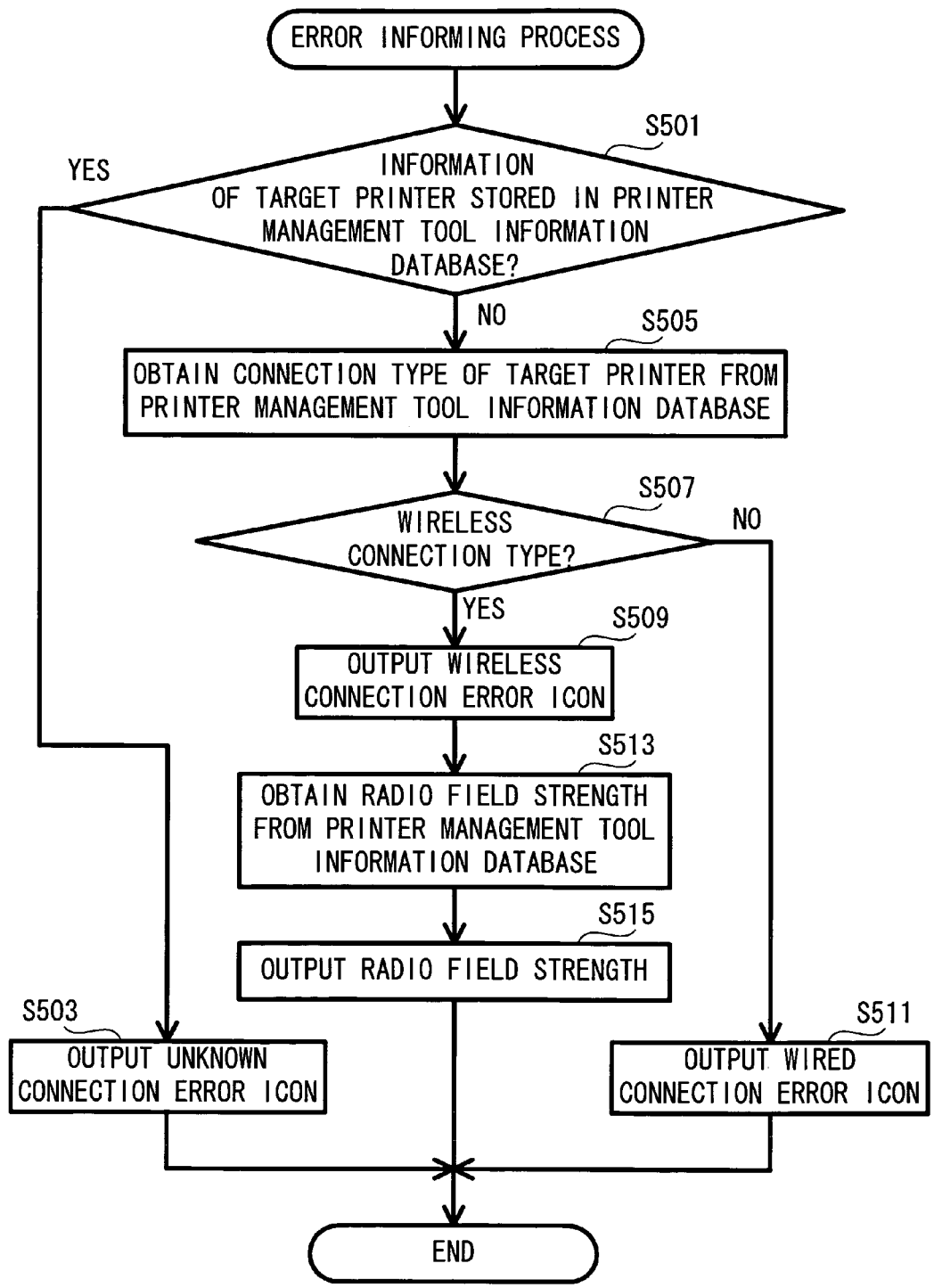
FIG. 22 is a flowchart of a variation of the error informing process.

Instead of outputting the current radio field strength, which is obtained at S103, at S107 in the printer information update process as shown in FIG. 9, for a wireless printer having a problem (a target printer), the radio field strength of the target printer obtained at S103 in the printer information previous update process may be read from the printer management tool information database at S513 and the read radio field strength is outputted at S515, as shown in FIG. 22. FIG. 22 shows a flowchart of a variation of the error informing process of FIG. 13. The contents of the variation of the error informing process of FIG. 22 are similar to those of the error informing process of FIG. 13 except that the variation includes S513 and S515. Because the previously-obtained radio field strength is outputted instead of the current radio field strength, the user can understand that the bad communication quality is caused by factors other than the radio field strength even when the server 1 cannot obtain the current radio field strength from the target printer.

Figure 23:
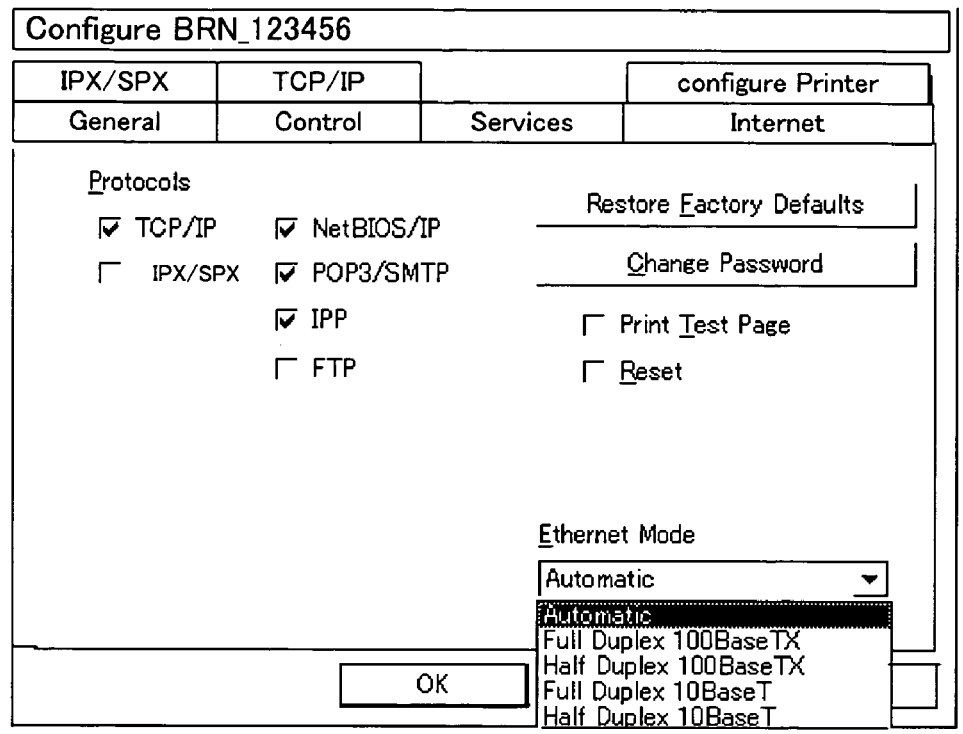
FIG. 23 is a diagram showing a common setting screen for all printers.
Figure 25:
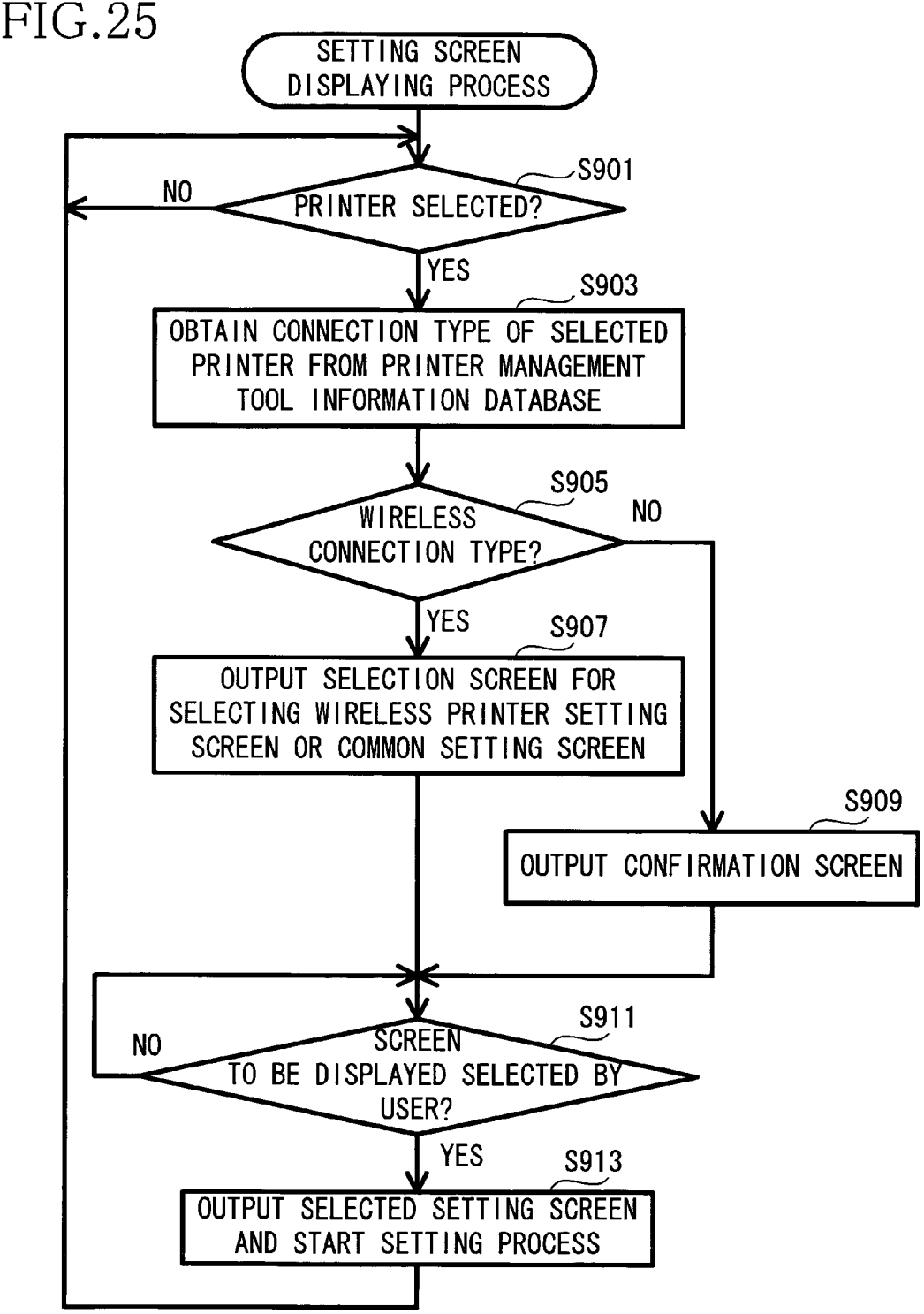
FIG. 25 is a flowchart of a setting screen displaying process.

By a setting screen displaying process of FIG. 25, it is monitored whether the user has provided instructions for printer setting on the web page of FIG. 5. When the instructions are made, a setting screen of FIG. 23 or 24 is displayed and a setting process is started. When it is designed such that the server 1 performs the setting screen displaying process, the user can make the setting on a target printer immediately after confirming the conditions of the target printer. Accordingly, the user can deal speedily with the problem arising in the target printer.

The setting screen displaying process will be described with reference to FIG. 25. The setting screen displaying process starts when the power of the server 1 is turned on. First, it is determined whether a printer has been selected by the user on the web page of FIG. 5 (e.g. whether a printer node name in the list of FIG. 5 has been clicked) (S901). When a printer has been selected by the user (S901:YES), the connection type of the printer selected by the user is obtained from the printer management tool information database (S903). When the selected printer is the wireless connection type (S905:YES), a selection screen for selecting a setting screen to be displayed is outputted and flow waits for the user to select one of the setting screens (S911). That is, at S907, the selection screen for selecting either of a wireless printer setting screen (FIG. 24) or a common setting screen (all types of printers: both wireless and wired printers) (FIG. 23) is outputted. When one of the setting screens is selected by the user (S911:YES), the selected setting screen is displayed and the setting process is started to allow the user to perform the setting on the selected printer (S913). When the selected screen is the wireless printer setting screen, the screen of FIG. 24 is displayed. When the selected screen is the common setting screen, the screen of FIG. 23 is displayed. When the selected printer is the wired connection type (S905:NO), a confirmation screen that notifies the user that the common setting screen will appear is outputted (S909) and flow waits for the user to accept the display of the common setting screen (S911). The following steps are the same as the case where an affirmative determination is made at S905 (S905:YES).

As shown in FIG. 24, in the wireless printer setting screen, various items, for example, a wireless LAN protocol (IEEE802.11a/b/g) to be used, a channel to be used, a communication mode (an infrastructure mode or an ad hoc mode), and a wireless security to be adopted, can be set.

Further, as shown in FIG. 23, in the common setting screen, various items, for example, a protocol (such as TCP/IP and IPX/SPX) to be used and a communication speed to be adopted on the LAN, can be set.

In the above-described exemplary embodiment, the server 1 outputs the printer information of FIG. 5 by a web page. However, a printer management program may be run on the server 1 to display the printer information of FIG. 5 on the screen of the server 1. In this case, the setting screen displaying process of FIG. 25 can be started when the printer management program runs or when the printer information of FIG. 5 is displayed.

In the above-described exemplary embodiment, the multifunctional machines 11 to 14 are used as an example of the wireless network devices. However, the invention is not limited to the exemplary embodiment. A single-function device, such as a printer, a scanner, a facsimile machine, or a network device, which is to be used on the wireless network for a certain time period, such as a network camera, audiovisual equipment, projector and network storage, may be used. Likewise the wired network devices can also be single function devices with appropriate interfaces.

What is claimed is:

1. A network device management system, comprising:
a computer configured to be connected to a network;
a plurality of network devices configured to be connected to the network; and
a wireless Local Area Network LAN access point configured to be connected to the network;
wherein each of the plurality of network devices comprises:
a network device wired Local Area Network LAN interface configured to allow the network device to be connected wiredly to the network in accordance with a wired Local Area Network LAN standard: and
a network device wireless Local Area Network LAN interface configured to allow the network device to establish a connection with the wireless Local Area Network LAN access point in accordance with a wireless Local Area Network LAN standard:
a network device processor; and
a network device memory that stores device information and first computer-readable instructions therein,
wherein the device information comprises:
a device identifier identifying the network device and including one or more of a node name, a MAC address, and an IP address of the network device;
connection type information indicating one of a wired Local Area Network LAN connection type and a wireless Local Area Network LAN connection type to be used for the network device to establish a connection with the network, wherein the wired Local Area Network LAN connection type is a connection in which the network device is wiredly connected to the network by using the network device wired Local Area Network LAN interface and the wireless Local Area Network LAN connection type is another connection in which the network device is connected to the network via the wireless Local Area Network LAN access point connected to the network by establishing connection with the wireless Local Area Network LAN access point by using the network device wireless Local Area Network LAN interface; and
wireless information including an Service Set Identifier SSID and one or more of radio field information and communication quality information, wherein the Service Set Identifier SSID is used by the network device wireless Local Area Network LAN interface for establishing the connection between the network device and the wireless Local Area Network LAN access point connected to the network, the radio field information indicates a radio field strength obtained when communication is performed between the network device wireless Local Area Network LAN interface and the wireless Local Area Network LAN access point connected to the network, and the communication quality information indicates communication quality obtained when communication is performed between the network device wireless Local Area Network LAN interface and the wireless Local Area Network LAN access point connected to the network,
wherein the first computer-readable instructions cause each of the plurality of network devices to perform:
controlling the network device wired Local Area Network LAN interface to allow the network device to be wiredly connected to the network in accordance with the wired Local Area Network LAN standard when the connection type information stored in the network device memory indicates the wired Local Area Network LAN connection type;

controlling the network device wireless Local Area Network LAN interface to allow the network device to be connected to the wireless Local Area Network LAN access point connected to the network in accordance with the wireless Local Area Network LAN standard when the connection type information stored in the network device memory indicates the wireless Local Area Network LAN connection type;

updating the one or more of the device identifier, the connection type information, and the Service Set Identifier SSID when the network device has received an instruction to change information of one or more of the device identifier, the connection type information, and the Service Set Identifier SSID that are changeable by a user and stored in the network device memory as the device information;

obtaining, at a predetermined timing, one or more of the radio field strength and the communication quality of the wireless information that is to be changed by environment between the network device and the wireless Local Area Network LAN access point, and updating the wireless information stored in the network device memory;

reading the device identifier from the network-device memory, wherein the device identifier request information is a request for transmission of the device identifier of the network device;

controlling the selected one of the network device wired Local Area Network LAN interface and the network device wireless Local Area Network LAN interface to send the device identifier read from the network-device memory to the computer;

detecting a receiving of a device information request when the selected one of the network device wired Local Area Network LAN interface and the network device wireless Local Area Network LAN interface received device information request information from the computer, wherein the device information request information is a request for transmission of the device information, wherein when the connection type information indicates the wireless Local Area Network LAN connection type, reading the device identifier, the connection type information, and the wireless information from the network device memory;

wherein when the connection type information indicates the wired Local Area Network LAN connection type, reading the device identifier and the connection type information from the network device memory; and controlling the selected one of the network device wired Local Area Network LAN interface and the network device wireless Local Area Network LAN interface to send the information read from the network device memory to the computer that is the sender of the device information request information;

wherein the computer comprises:
a computer interface configured to allow the computer to connect to the network;
a computer processor; and
a computer memory that stores second computer-readable instructions therein, the second computer-readable instructions instructing the computer to perform functions comprising:

storing the device identifier received by the computer interface in the computer memory when the computer interface receives the device identifier from the network device;

selecting one or more of the device identifiers stored in the computer memory as one or more selected device identifiers;

storing the device information received by the computer interface in the computer memory when the computer interface receives the device information of the network device identified by the one or more selected device identifiers; and determining each connection type being used based on the connection type information included in each of the stored device information;

when the connection type indicates the wireless Local Area Network LAN connection type, generating a wireless device information row comprising a wireless Local Area Network LAN connection type icon and one or more of a device identifier, an Service Set Identifier SSID, and wireless information included in the device information, wherein the wireless Local Area Network LAN connection type icon represents that the network device is connected to the network by using the wireless LAN connection type; and when the connection type indicates the wired Local Area Network LAN connection type, generating a wired device information row comprising a wired Local Area Network LAN connection type icon and the device identifier in the device information, wherein the wired Local Area Network LAN connection type icon represents that the network device is connected to the network by using the wired Local Area Network LAN connection type, and an aspect of the wired Local Area Network LAN connection type icon is different from an aspect of the wireless Local Area Network LAN connection type icon; and displaying a network device list comprising the wireless device information rows and the wired device information rows, on a display.

2. The network device management system according to claim 1, wherein the wireless device information row further comprises:
the wireless Local Area Network LAN connection type icon, the device identifier, and another information in this order, the other information including at least one of the wireless information and the Service Set Identifier SSID.

3. The network device management system according to claim 1, wherein the wired device information row further comprises:
the wired Local Area Network LAN connection type icon, the device identifier, and another information, the other information including at least one of a Service Set Identifier SSID undisplayable information and a wireless information undisplayable information,
wherein the Service Set Identifier SSID undisplayable information represents that the Service Set Identifier SSID cannot be displayed and the wireless information undisplayable information represents that the wireless information cannot be displayed.

4. The network device management system according to claim 3, wherein the wired device information row further comprises:

the wired Local Area Network LAN connection type icon, the device identifier, and the other information in this order.

5. The network device management system according to claim 1, wherein the device list further comprises:
an item name row above all of the wireless device information row and the wired device information row, on the display, the item name row comprises:
an item name of the device identifier; and
one or more item names of the Service Set Identifier SSID and the wireless information;
wherein the device identifier is included in an device identifier item name column, the Service Set Identifier SSID is included in an Service Set Identifier SSID item name column, and the wireless information is included in an wireless information item name column, wherein the device identifier item name column is the column of the item name of the device identifier, the Service Set Identifier SSID item name column is the column of the item name of the Service Set Identifier SSID, the wireless information item name column is the column of the item name of the wireless information.

6. The network device management system according to claim 5, wherein the Service Set Identifier SSID undisplayable information is included in the Service Set Identifier SSID item name column and the wireless information undisplayable information is included in the wireless information item name column.

7. A computer that is configured to be connected to a network, the computer comprising:
a computer interface configured to allow the computer to connect to the network;
a computer processor; and
a computer memory that stores computer-readable instructions therein, the computer-readable instructions instructing the computer to perform functions comprising:
storing a device identifier received by the computer interface in the computer memory when the computer interface receives the device identifier from a network device;
selecting one or more of the device identifiers stored in the computer memory as one or more selected device identifiers;
storing a device information received by the computer interface in the computer memory when the computer interface receives the device information of the network device identified by the one or more selected device identifiers; and
determining each connection type being used based on connection type information included in each of the stored device information;
when the connection type indicates a wireless Local Area Network LAN connection type, generating a wireless device information row comprising a wireless Local Area Network LAN connection type icon and one or more of a device identifier, an Service Set Identifier SSID, and wireless information included in the device information, wherein the wireless Local Area Network LAN connection type icon represents that the network device is connected to the network by using the wireless Local Area Network LAN connection type; and
when the connection type indicates a wired Local Area Network LAN connection type, generating a wired device information row comprising a wired Local Area Network LAN connection type icon and the device identifier in the device information, wherein the wired Local Area Network LAN connection type icon represents that the network device is connected to the network by using the wired Local Area Network LAN connection type, and an aspect of the wired Local Area Network LAN connection type icon is different from an aspect of the wireless Local Area Network LAN connection type icon; and
displaying a network device list comprising the wireless device information rows and the wired device information rows, on a display.

8. A non-transitory computer-readable medium including a computer program product for use in a computer connected to a network, wherein the computer program product causes the computer to execute:
storing a device identifier received by a computer interface in a computer memory when the computer interface receives the device identifier from a network device;
selecting one or more of the device identifiers stored in the computer memory as one or more selected device identifiers;
storing a device information received by the computer interface in the computer memory when the computer interface receives the device information of the network device identified by the one or more selected device identifiers; and
determining each connection type being used based on connection type information included in each of the stored device information;
when the connection type indicates a wireless Local Area Network LAN connection type, generating a wireless device information row comprising a wireless Local Area Network LAN connection type icon and one or more of a device identifier, an Service Set Identifier SSID, and wireless information included in the device information, wherein the wireless Local Area Network LAN connection type icon represents that the network device is connected to the network by using the wireless Local Area Network LAN connection type; and
when the connection type indicates a wired Local Area Network LAN connection type, generating a wired device information row comprising a wired Local Area Network LAN connection type icon and the device identifier in the device information, wherein the wired Local Area Network LAN connection type icon represents that the network device is connected to the network by using the wired Local Area Network LAN connection type, and an aspect of the wired Local Area Network LAN connection type icon is different from an aspect of the wireless Local Area Network LAN connection type icon; and
displaying a network device list comprising the wireless device information rows and the wired device information rows, on a display.

9. A method of managing a network device that is connected to a network using a computer that is connected to the network, the method comprising:
storing a device identifier received by a computer interface in a computer memory when the computer interface receives the device identifier from a network device;
selecting one or more of the device identifiers stored in the computer memory as one or more selected device identifiers;
storing a device information received by the computer interface in the computer memory when the computer interface receives the device information of the network device identified by the one or more selected device identifiers; and determining each connection type being used based on connection type information included in each of the stored device information;

when the connection type indicates a wireless Local Area Network LAN connection type, generating a wireless device information row comprising a wireless Local Area Network LAN connection type icon and one or more of a device identifier, an Service Set Identifier SSID, and wireless information included in the device information, wherein the wireless Local Area Network LAN connection type icon represents that the network device is connected to the network by using the wireless Local Area Network LAN connection type; and when the connection type indicates a wired Local Area Network LAN connection type, generating a wired device information row comprising a wired Local Area Network LAN connection type icon and the device identifier in the device information, wherein the wired Local Area Network LAN connection type icon represents that the network device is connected to the network by using the wired Local Area Network LAN connection type, and an aspect of the wired Local Area Network LAN connection type icon is different from an aspect of the wireless Local Area Network LAN connection type icon; and displaying a network device list comprising the wireless device information rows and the wired device information rows, on a display.

10. A network device connectable to a network and having an identifier identifying the network device, the network device comprising:

a network device wired Local Area Network LAN interface configured to allow the network device to be connected wiredly to the network in accordance with a wired Local Area Network LAN standard; and a network device wireless Local Area Network LAN interface configured to allow the network device to establish a connection with a wireless Local Area Network LAN access point in accordance with a wireless Local Area Network LAN standard;

a network device processor; and a network device memory that stores device information and first computer-readable instructions therein, wherein the device information comprises:

a device identifier identifying the network device and including one or more of a node name, a MAC address, and an IP address of the network device;

connection type information indicating one of a wired Local Area Network LAN connection type and a wireless Local Area Network LAN connection type to be used for the network device to establish a connection with the network, wherein the wired Local Area Network LAN connection type is a connection in which the network device is wiredly connected to the network by using the network device wired Local Area Network LAN interface and the wireless Local Area Network LAN connection type is another connection in which the network device is connected to the network via the wireless Local Area Network LAN access point connected to the network by establishing connection with the wireless Local Area Network LAN access point by using the network device wireless Local Area Network LAN interface; and wireless information including an Service Set Identifier SSID and one or more of radio field information and communication quality information, wherein the Service Set Identifier SSID is used by the network device wireless Local Area Network LAN interface for establishing the connection between the network device and the wireless Local Area Network LAN access point connected to the network, the radio field information indicates a radio field strength obtained when communication is performed between the network device wireless Local Area Network LAN interface and the wireless Local Area Network LAN access point connected to the network, and the communication quality information indicates communication quality obtained when communication is performed between the network device wireless Local Area Network LAN interface and the wireless Local Area Network LAN access point connected to the network; and wherein the first computer-readable instructions cause the network device to perform:

controlling the network device wired Local Area Network LAN interface to allow the network device to be wiredly connected to the network in accordance with the wired Local Area Network LAN standard when the connection type information stored in the network device memory indicates the wired Local Area Network LAN connection type;

controlling the network device wireless Local Area Network LAN interface to allow the network device to be connected to the wireless Local Area Network LAN access point connected to the network in accordance with the wireless Local Area Network LAN standard when the connection type information stored in the network device memory indicates the wireless Local Area Network LAN connection type;

updating the one or more of the device identifier, the connection type information, and the Service Set Identifier SSID when the network device has received an instruction to change information of one or more of the device identifier, the connection type information, and the Service Set Identifier SSID that are changeable by a user and stored in the network device memory as the device information;

obtaining, at a predetermined timing, one or more of the radio field strength and the communication quality of the wireless information that is to be changed by environment between the network device and the wireless Local Area Network LAN access point, and updating the wireless information stored in the network device memory;

reading the device identifier from the network-device memory, wherein the device identifier request information is a request for transmission of the device identifier of the network device;

controlling the selected one of the network device wired Local Area Network LAN interface and the network device wireless Local Area Network LAN interface to send the device identifier read from the network-device memory to the computer;

detecting a receiving of a device information request when the selected one of the network device wired Local Area Network LAN interface and the network device wireless Local Area Network LAN interface received device information request information from the computer, wherein the device information request information is a request for transmission of the device information, wherein when the connection type information indicates the wireless Local Area Network LAN connection type, reading the device identifier, the connection type information, and the wireless information from the network device memory;

wherein when the connection type information indicates the wired Local Area Network LAN connection type, reading the device identifier and the connection type information from the network device memory; and controlling the selected one of the network device wired Local Area Network LAN interface and the network device wireless Local Area Network LAN interface to send the information read from the network device memory to the computer that is the sender of the device information request information.

* * * * *